United States Patent
Won et al.

(10) Patent No.: US 10,039,078 B2
(45) Date of Patent: Jul. 31, 2018

(54) APPARATUS AND METHOD FOR MANAGING TRACKING AREA LIST IN WIRELESS COMMUNICATION SYSTEM

(71) Applicant: Samsung Electronics Co., Ltd., Gyeonggi-do (KR)

(72) Inventors: Jeong-Jae Won, Gyeonggi-do (KR); Roy Abhishek, Gyeonggi-do (KR); Dae-Joong Kim, Gyeonggi-do (KR); Han-Seok Kim, Seoul (KR); Hwa-Jin Cha, Gyeonggi-do (KR); Jung-Min Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 14/363,293

(22) PCT Filed: Dec. 4, 2012

(86) PCT No.: PCT/KR2012/010406
§ 371 (c)(1),
(2) Date: Jun. 5, 2014

(87) PCT Pub. No.: WO2013/085242
PCT Pub. Date: Jun. 13, 2013

(65) Prior Publication Data
US 2014/0349689 A1    Nov. 27, 2014

(30) Foreign Application Priority Data
Dec. 5, 2011  (KR) .................. 10-2011-0128953

(51) Int. Cl.
*H04W 68/02*  (2009.01)
*H04W 60/04*  (2009.01)

(52) U.S. Cl.
CPC ........... *H04W 68/02* (2013.01); *H04W 60/04* (2013.01)

(58) Field of Classification Search
CPC ..... H04W 60/00; H04W 60/04; H04W 24/02; H04W 60/02; H04W 68/00; H04W 68/02; H04W 68/08
See application file for complete search history.

(56) References Cited

U.S. PATENT DOCUMENTS

2008/0102896 A1*  5/2008  Wang .................... H04W 36/34
                                                                  455/560
2010/0029298 A1*  2/2010  Iwamura .............. H04J 11/0069
                                                                  455/456.1

(Continued)

OTHER PUBLICATIONS

International Search Report dated Mar. 28, 2013 in connection with International Patent Application No. PCT/KR2012/010406, 3 pages.

(Continued)

*Primary Examiner* — Liton Miah

(57) ABSTRACT

Managing a tracking area list in a wireless communication system is provided. An operation of a Mobile Station (MS) includes transmitting a request for tracking area update for a 1st tracking area, receiving a tracking area list to which the 1st tracking area and a 2nd tracking area are added, and updating a stored tracking area list by the tracking area list to which the 1st tracking area and the 2nd tracking area are added.

30 Claims, 14 Drawing Sheets

: CONGESTION TRACKING AREA

(56) References Cited

U.S. PATENT DOCUMENTS

| | | | |
|---|---|---|---|
| 2010/0061308 A1* | 3/2010 | Becker | H04W 60/04 370/328 |
| 2010/0069088 A1* | 3/2010 | Fischer | H04W 60/04 455/456.1 |
| 2010/0075698 A1* | 3/2010 | Rune | H04W 68/08 455/458 |
| 2011/0044309 A1* | 2/2011 | Ye | H04W 68/08 370/338 |
| 2011/0096721 A1 | 4/2011 | Kamalaraj et al. | |
| 2011/0136517 A1 | 6/2011 | Seppalainen et al. | |
| 2011/0158165 A1* | 6/2011 | Dwyer | H04W 60/00 370/328 |
| 2011/0190010 A1 | 8/2011 | Cho | |
| 2011/0210845 A1* | 9/2011 | Xiong | H04W 60/00 340/539.13 |
| 2011/0261715 A1* | 10/2011 | Norefors | H04W 60/00 370/252 |
| 2012/0106423 A1* | 5/2012 | Nylander | H04W 52/0241 370/311 |
| 2012/0207013 A1* | 8/2012 | Kamalaraj | H04W 8/065 370/218 |
| 2012/0252451 A1* | 10/2012 | Knauft | H04W 8/06 455/436 |
| 2013/0183959 A1* | 7/2013 | Mihaly | H04W 60/00 455/422.1 |
| 2013/0203415 A1* | 8/2013 | Arvidsson | H04W 60/00 455/435.1 |

OTHER PUBLICATIONS

Written Opinion of International Searching Authority dated Mar. 28, 2013 in connection with International Patent Application No. PCT/KR2012/010406, 5 pages.

* cited by examiner

[Fig. 1]
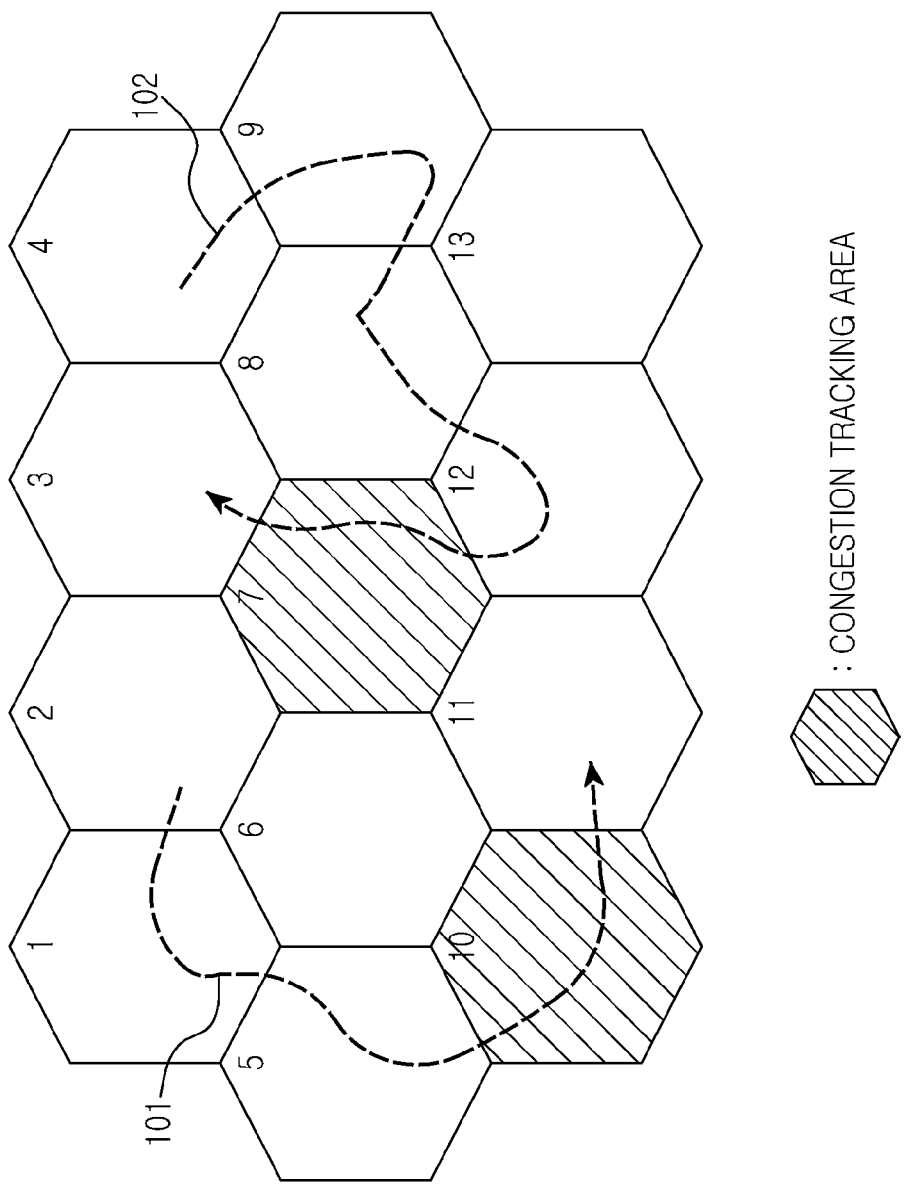

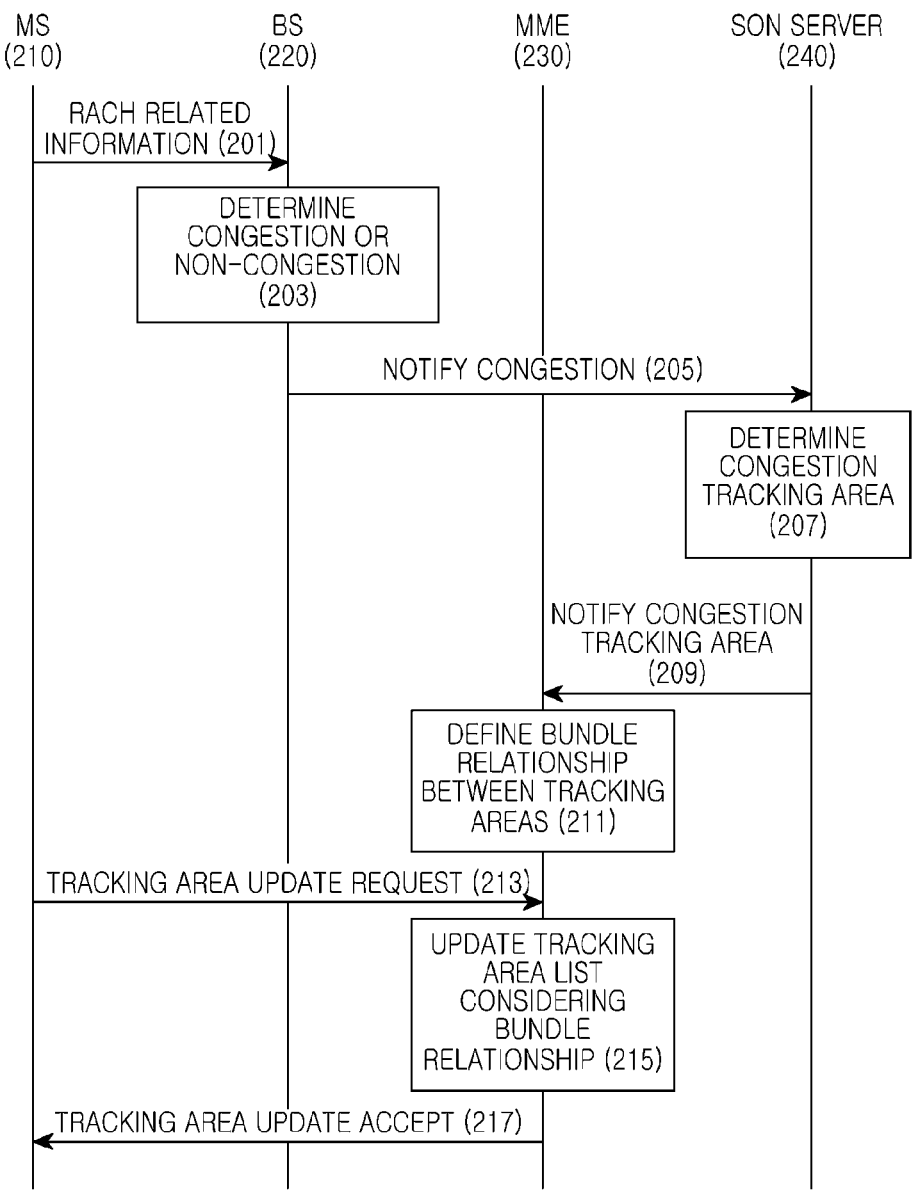
[Fig. 2]

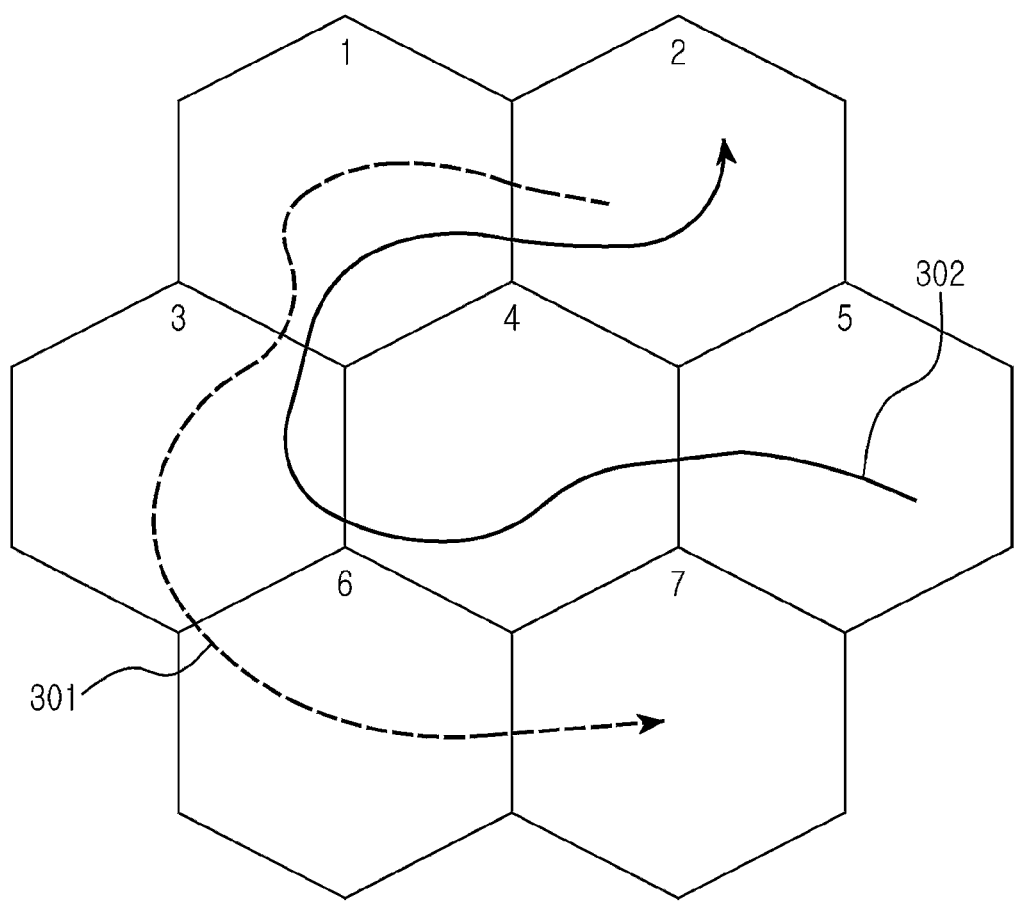
[Fig. 3]

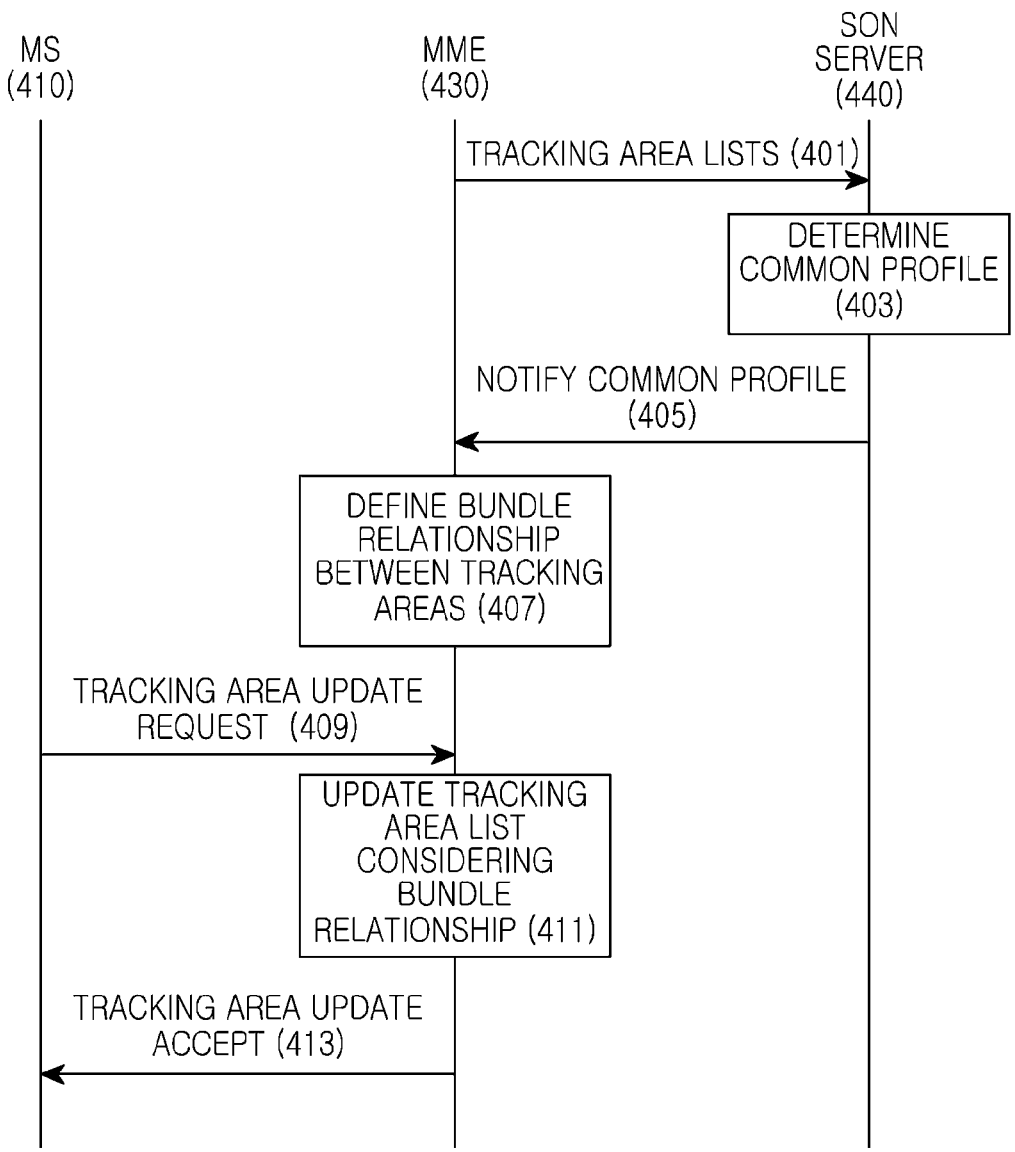

[Fig. 5]
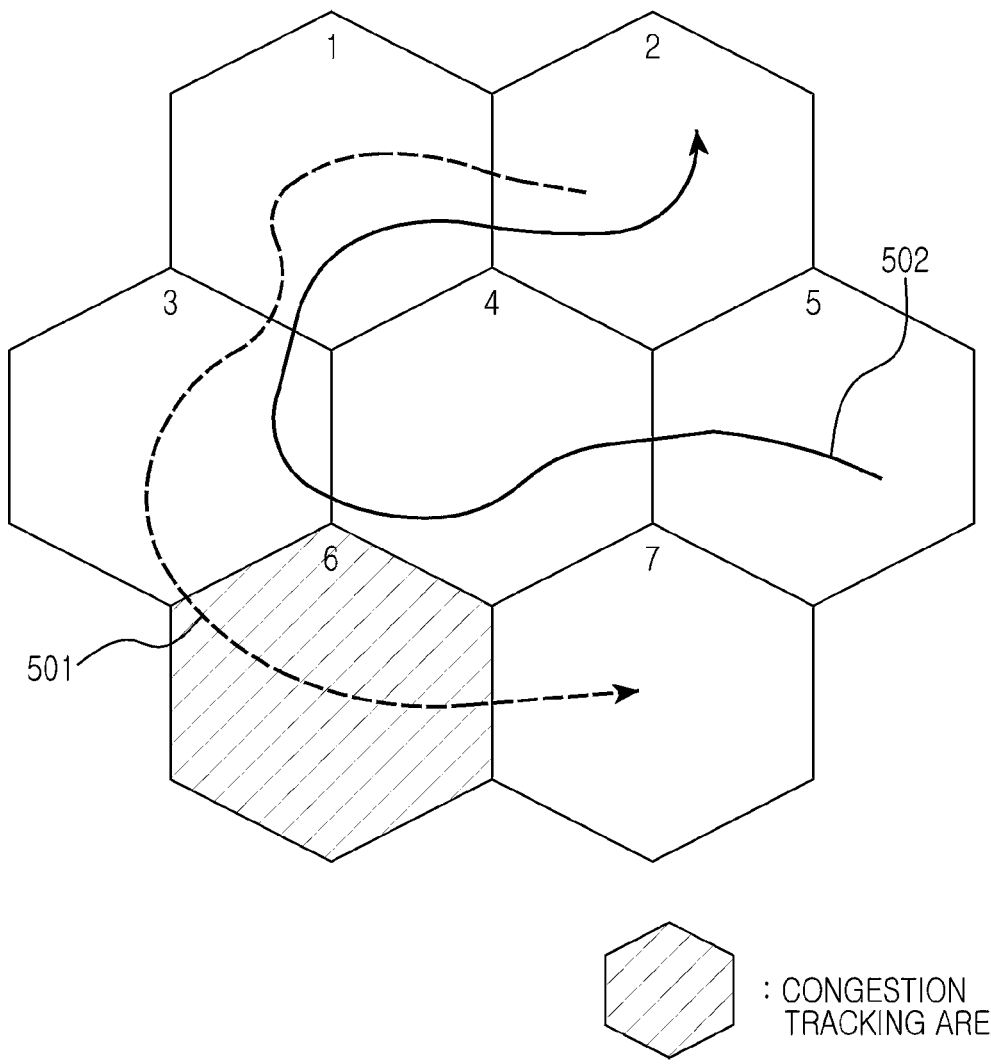

[Fig. 6]
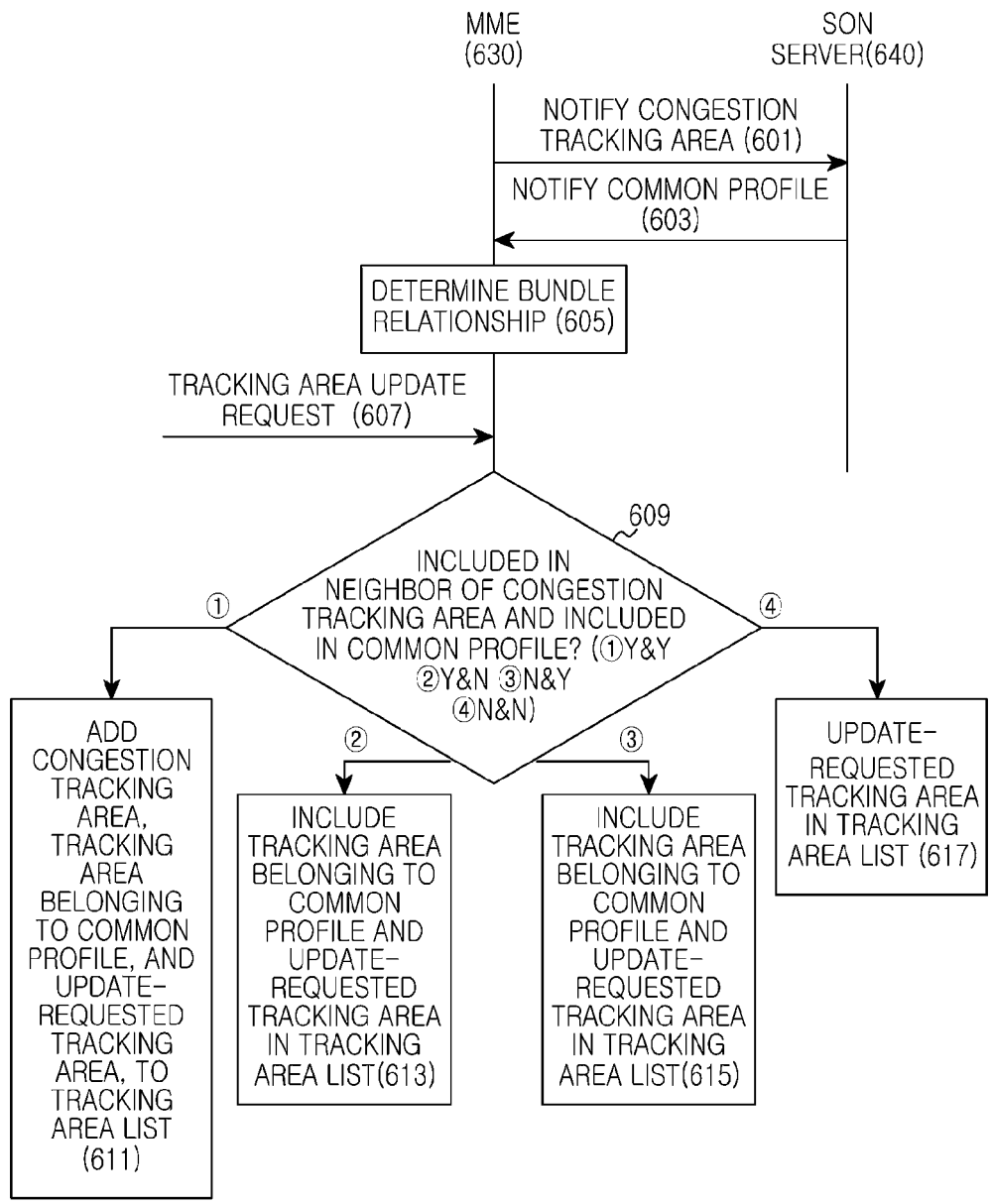

[Fig. 7]
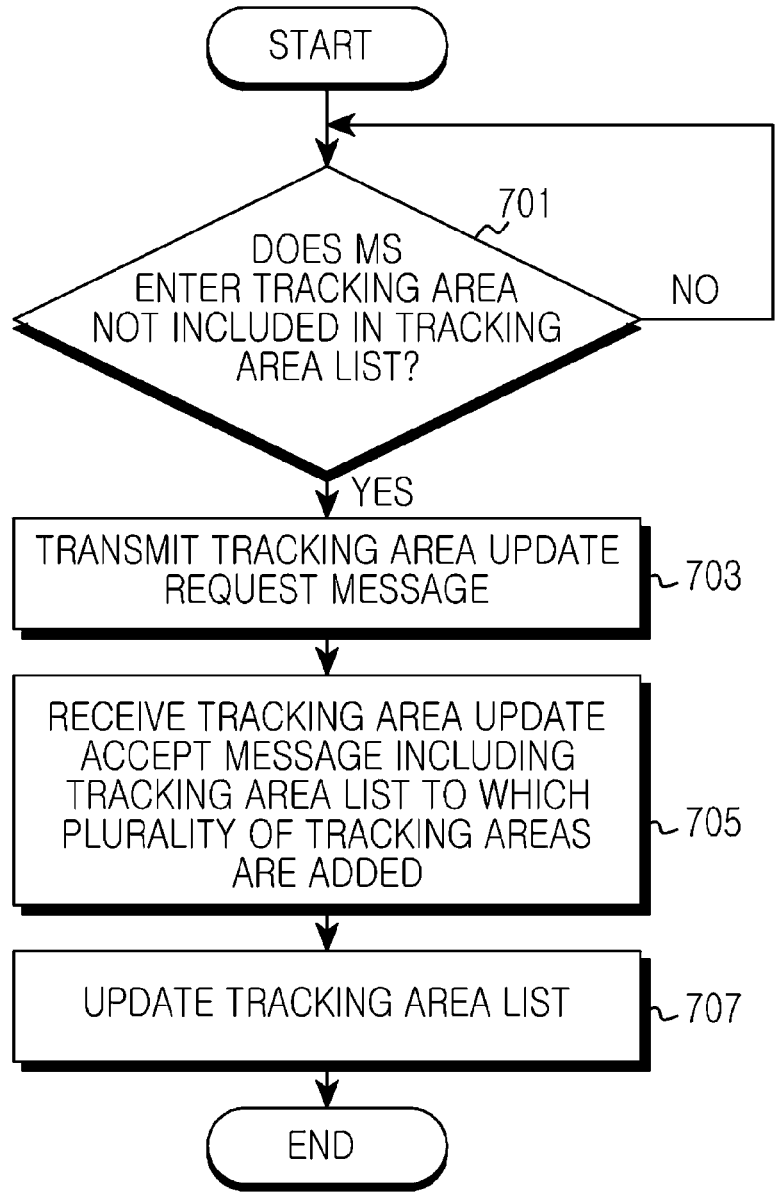

[Fig. 8]
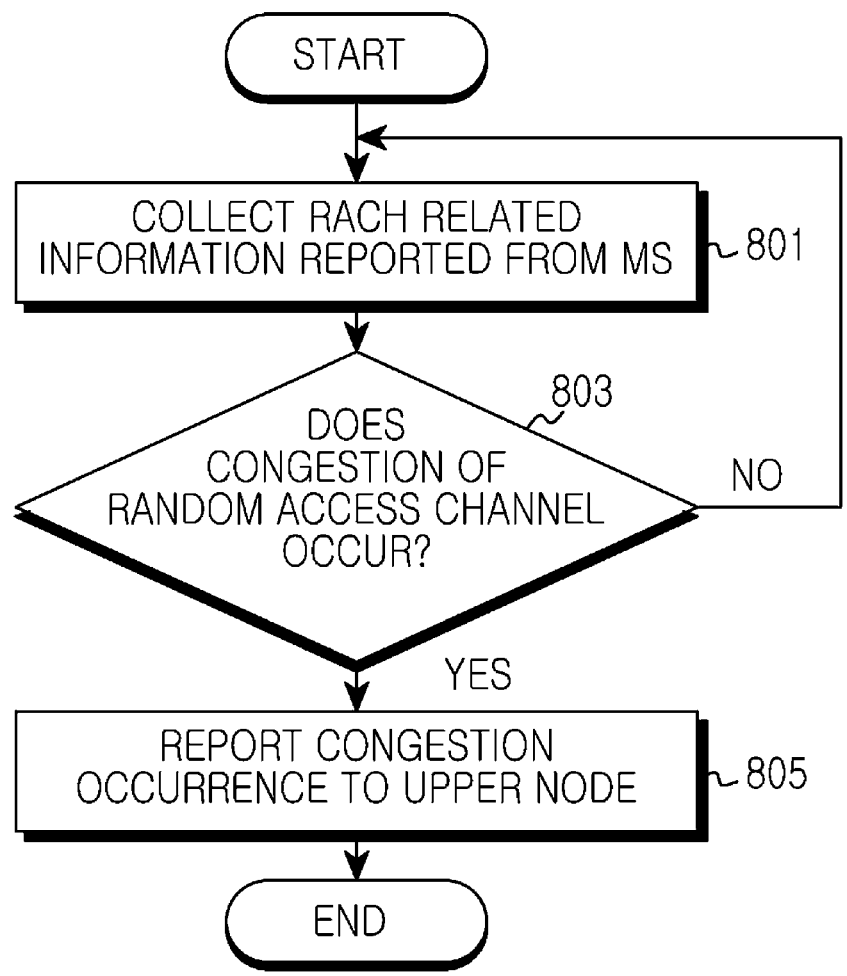

[Fig. 9]
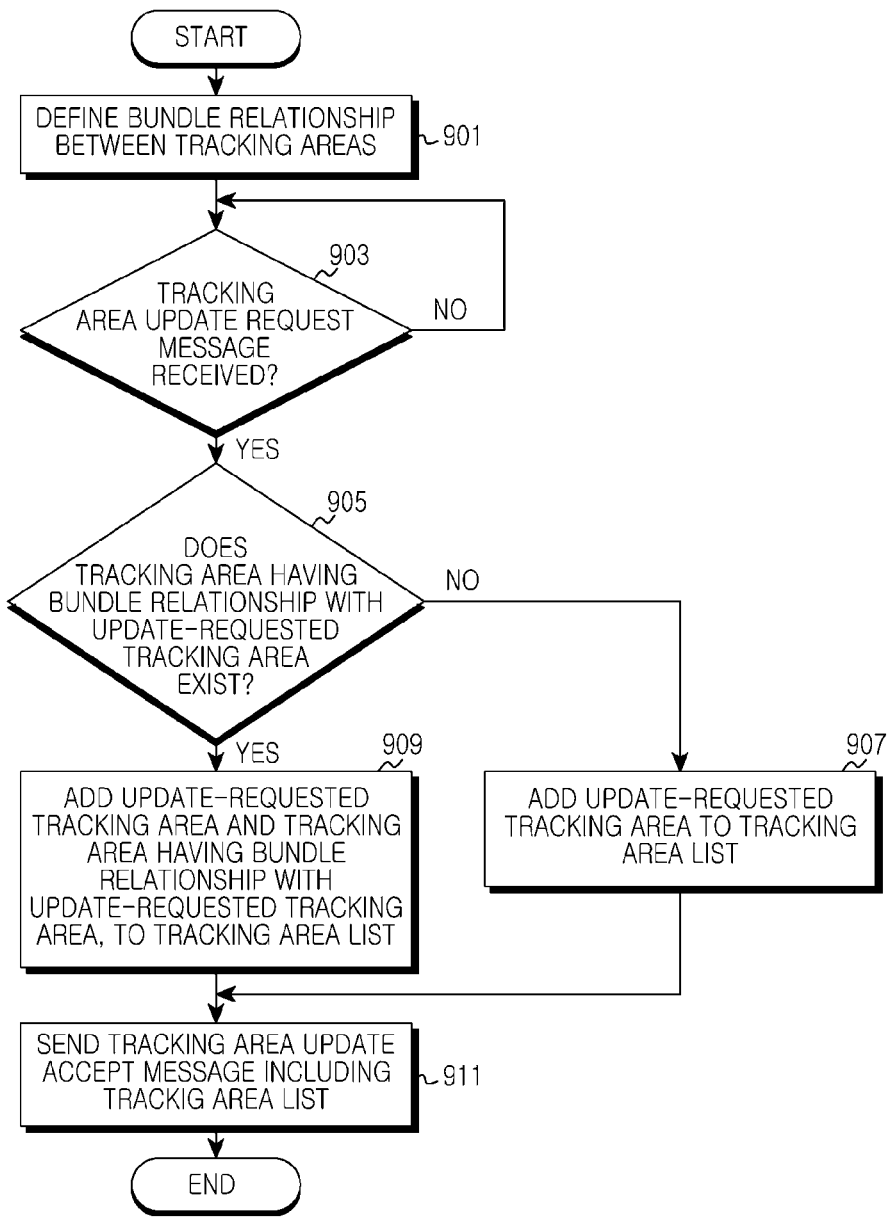

[Fig. 10]
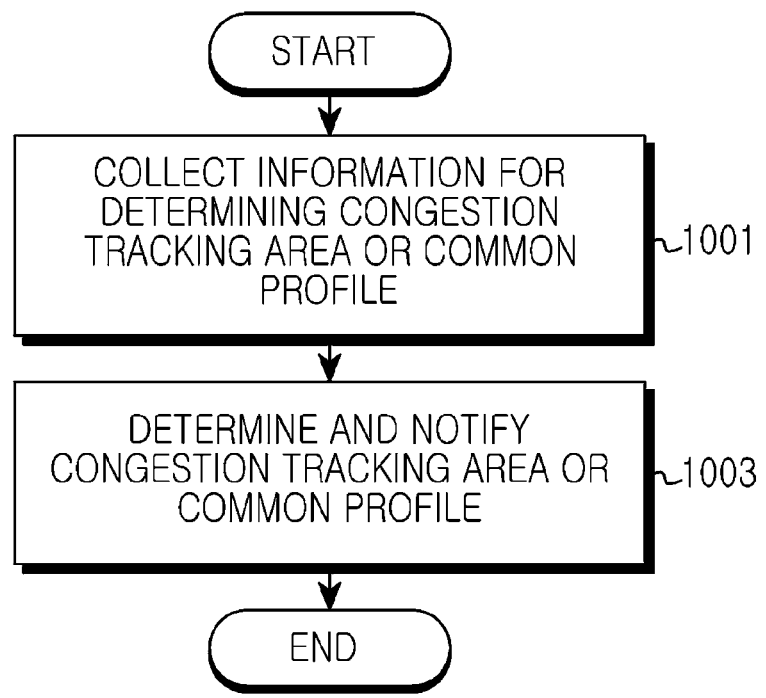

[Fig. 11]
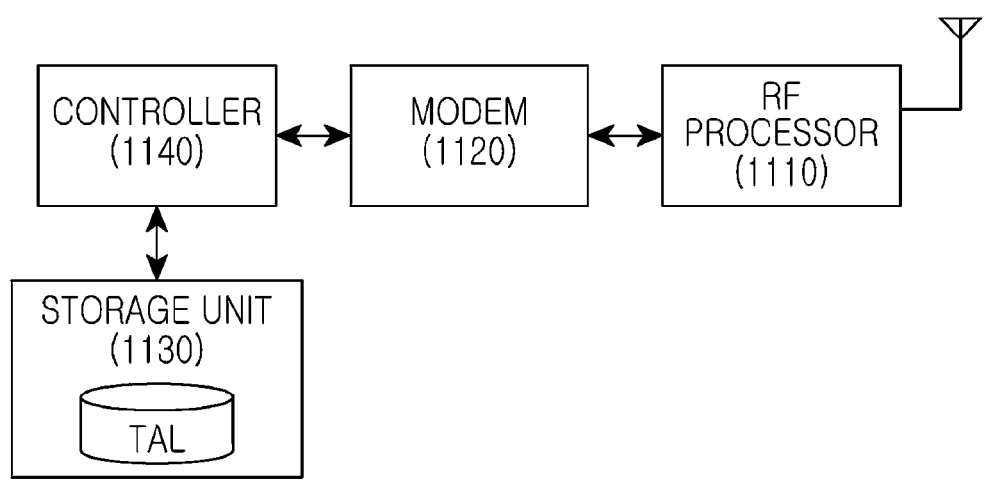

[Fig. 12]
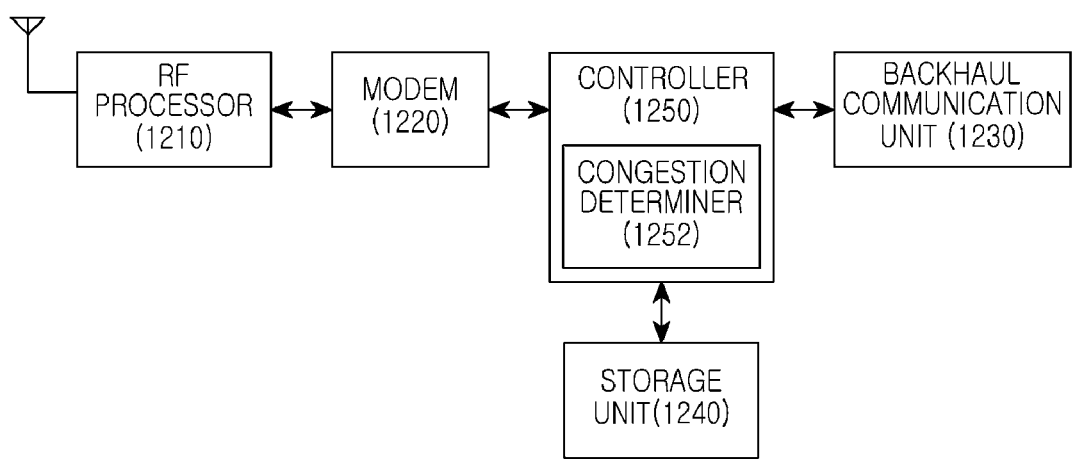

[Fig. 13]
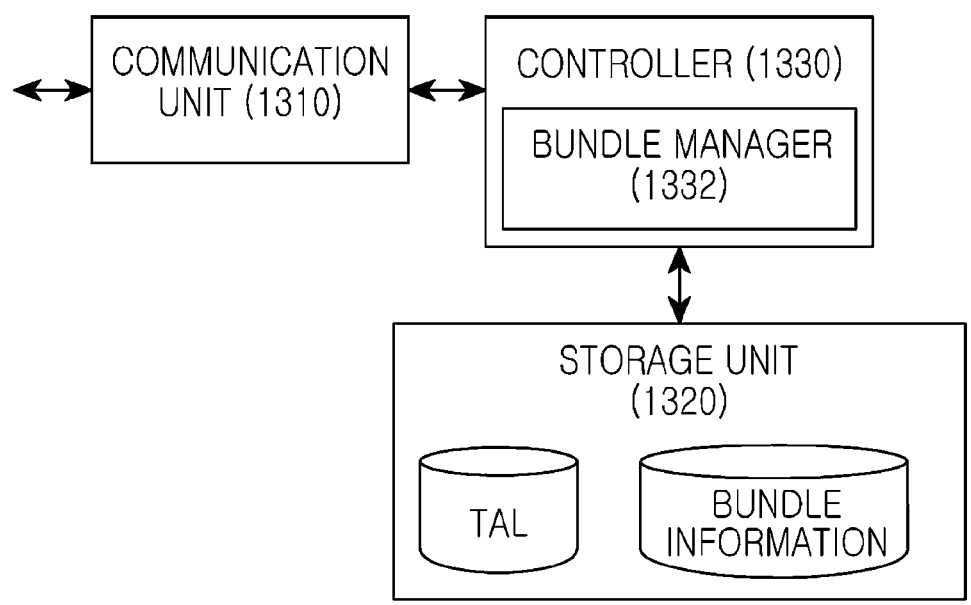

[Fig. 14]
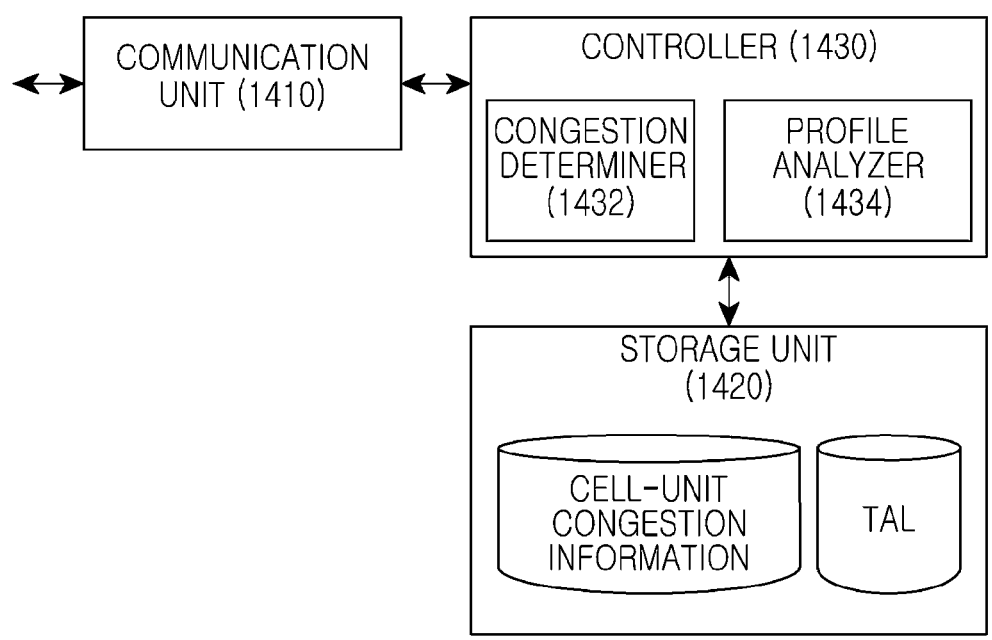

APPARATUS AND METHOD FOR MANAGING TRACKING AREA LIST IN WIRELESS COMMUNICATION SYSTEM

CROSS-REFERENCE TO RELATED APPLICATION(S)

The present application claims priority under 35 U.S.C. § 365 to International Patent Application No. PCT/KR2012/010406 filed Dec. 4, 2012, entitled "APPARATUS AND METHOD FOR MANAGING TRACKING AREA LIST IN WIRELESS COMMUNICATION". International Patent Application No. PCT/KR2012/010406 claims priority under 35 U.S.C. § 365 and/or 35 U.S.C. § 119(a) to Korean Patent Application No. 10-2011-0128953 filed Dec. 5, 2011 and which are incorporated herein by reference into the present disclosure as if fully set forth herein.

TECHNICAL FIELD

The present invention relates to a wireless communication system.

BACKGROUND ART

Generally, a wireless communication system supports an active mode of a Mobile Station (MS) and an idle mode thereof. The active mode is a state in which the MS is performing communication. The idle mode is a state in which the MS stops communication due to the lack of transmitted/received traffic and identifies only the generation or non-generation of traffic. A location of the MS of the active mode is recognized in the cell unit, but a location of the MS of the idle mode is recognized in the area unit including at least one cell. The area unit is designated as a paging area, a Tracking Area (TA) and the like.

One tracking area includes at least one cell and, upon network design, division of the tracking area is defined. Each Base Station (BS) knows to which tracking area itself belongs, and broadcasts information notifying a tracking area that itself belongs to. According to this, through the information transmitted in the BS, an MS can identify in which tracking area itself is now located. And then, the MS informs a system in which tracking area itself is located. This procedure is designated as Tracking Area Update (TAU). The tracking area update procedure is carried out when there is a change of a tracking area where the MS is located. Due to this, the system can track in which tracking area the MS is now located.

However, in a case where the changed tracking area has been included in a Tracking Area List (TAL) of the MS, the MS does not perform the tracking area update procedure. The tracking area list includes at least one tracking area where the MS is now located or was located in the past. The tracking area list is a range in which paging is performed. If traffic going toward the MS is generated, the system transmits a message of paging the MS using at least one BS that is installed in at least one tracking area included in the tracking area list of the MS. According to this, the MS recognizes the generation of the traffic to be received, and transits to the active mode.

For the tracking area update procedure, an MS transmits a request for uplink resources through a Random Access CHannel (RACH), and transmits a tracking area update request message through the uplink resources. At this time, when attempts on tracking area update request procedures are made by a plurality of MSs in a specific tracking area, a computational load of the system is intensively increased. Further, because the plurality of MSs transmit signals through the random access channel, congestion in the random access channel occurs and thus, a possibility of a signal transmission failure increases. If a failure of the random access channel occurs, tracking area update cannot be carried out and, as a result, a possibility of a paging failure increases.

DISCLOSURE OF INVENTION

Solution to Problem

An aspect of the present invention is to substantially solve at least the above problems and/or disadvantages and to provide at least the advantages below. Accordingly, one aspect of the present invention is to provide an apparatus and method for effectively managing a tracking area list in a wireless communication system.

Another aspect of the present invention is to provide an apparatus and method for enhancing a success rate of a tracking area update procedure in a wireless communication system.

A further aspect of the present invention is to provide an apparatus and method for preventing a situation in which a tracking area update procedure is intensively performed in a specific tracking area, in a wireless communication system.

Yet another aspect of the present invention is to provide an apparatus and method for managing a plurality of tracking areas as one bundle in a wireless communication system.

The above aspects are achieved by providing an apparatus and method for managing a tracking area list in a wireless communication system.

According to one aspect of the present invention, a method for operation of a Mobile Station (MS) in a wireless communication system is provided. The method includes transmitting a request for tracking area update for a 1st tracking area, receiving a tracking area list to which the 1st tracking area and a 2nd tracking area are added, and updating a stored tracking area list by the tracking area list to which the 1st tracking area and the 2nd tracking area are added.

According to another aspect of the present invention, a method for operation of a node managing the mobility of an MS and a tracking area list thereof in a wireless communication system is provided. The method includes determining the bundle relationship between tracking areas and, if there is a request for tracking area update for a 1st tracking area from the MS, determining if a 2nd tracking area having the bundle relationship with the 1st tracking area exists, and including the 1st tracking area and the 2nd tracking area in the tracking area list of the MS. The bundle relationship represents the relationship of, although there is a request for tracking area update for one tracking area among a plurality of tracking areas, including not only the update-requested tracking area but also the remnant tracking areas together in the tracking area list of the MS.

According to a further aspect of the present invention, a method of operation of a node controlling a network configuration in a wireless communication system is provided. The method includes generating information for determining the bundle relationship between tracking areas, and transmitting information for determining the bundle relationship, to a node managing a tracking area list of an MS. The bundle relationship represents the relationship of, although there is a request for tracking area update for one tracking area among a plurality of tracking areas, including not only the update-requested tracking area but also the remnant tracking areas together in the tracking area list of the MS.

According to yet another aspect of the present invention, an MS apparatus in a wireless communication system is provided. The apparatus includes a MOdulator/DEModulator (MODEM) and a controller. The modem transmits a message to request for tracking area update for a 1st tracking area, and receives a tracking area list to which the 1st tracking area and a 2nd tracking area are added. The controller updates a stored tracking area list by the tracking area list to which the 1st tracking area and the 2nd tracking area are added.

According to still another aspect of the present invention, a node apparatus managing the mobility of an MS and a tracking area list thereof in a wireless communication system is provided. The apparatus includes a storage unit and a controller. The storage unit stores information of the bundle relationship between tracking areas. The bundle relationship represents the relationship of, although there is a request for tracking area update for one tracking area among a plurality of tracking areas, including not only the update-requested tracking area but also the remnant tracking areas together in a tracking area list of an MS. The controller defines the bundle relationship and, if there is a request for tracking area update for a 1st tracking area from the MS, determines if a 2nd tracking area having the bundle relationship with the 1st tracking area exists, and includes the 1st tracking area and the 2nd tracking area in the tracking area list of the MS.

According to still another aspect of the present invention, a node apparatus controlling a network configuration in a wireless communication system is provided. The apparatus includes a controller and a communication unit. The controller generates information for determining the bundle relationship between tracking areas. The bundle relationship represents the relationship of, although there is a request for tracking area update for one tracking area among a plurality of tracking areas, including not only the update-requested tracking area but also the remnant tracking areas together in a tracking area list of an MS. The communication unit transmits information for determining the bundle relationship, to a node managing the tracking area list of the MS.

BRIEF DESCRIPTION OF DRAWINGS

The above and other objects, features and advantages of the present invention will become more apparent from the following detailed description when taken in conjunction with the accompanying drawings in which:

FIG. 1 is a diagram illustrating an example of the distribution of a congestion tracking area in a wireless communication system according to an exemplary embodiment of the present invention;

FIG. 2 is a ladder diagram illustrating tracking area list management using a congestion tracking area in a wireless communication system according to an exemplary embodiment of the present invention;

FIG. 3 is a diagram illustrating an example of the trajectory of a Mobile Station (MS) in a wireless communication system according to an exemplary embodiment of the present invention;

FIG. 4 is a ladder diagram illustrating tracking area list management using a common profile in a wireless communication system according to an exemplary embodiment of the present invention;

FIG. 5 is a diagram illustrating an example of the distribution of a congestion tracking area and the trajectory of an MS in a wireless communication system according to an exemplary embodiment of the present invention;

FIG. 6 is a ladder diagram illustrating tracking area list management using a congestion tracking area and a common profile in a wireless communication system according to an exemplary embodiment of the present invention;

FIG. 7 is a flowchart illustrating an operation procedure of an MS in a wireless communication system according to an exemplary embodiment of the present invention;

FIG. 8 is a flowchart illustrating an operation procedure of a Base Station (BS) in a wireless communication system according to an exemplary embodiment of the present invention;

FIG. 9 is a flowchart illustrating an operation procedure of a Mobility Management Entity (MME) in a wireless communication system according to an exemplary embodiment of the present invention;

FIG. 10 is a flowchart illustrating an operation procedure of a Self Organization Network (SON) server in a wireless communication system according to an exemplary embodiment of the present invention;

FIG. 11 is a block diagram illustrating a construction of an MS in a wireless communication system according to an exemplary embodiment of the present invention;

FIG. 12 is a block diagram illustrating a construction of a BS in a wireless communication system according to an exemplary embodiment of the present invention;

FIG. 13 is a block diagram illustrating a construction of an MME in a wireless communication system according to an exemplary embodiment of the present invention; and FIG. 14 is a block diagram illustrating a construction of a SON server in a wireless communication system according to an exemplary embodiment of the present invention.

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

The present invention relates to an apparatus and method for efficiently managing a tracking area list in a wireless communication system. Below, the present invention describes a technology for managing a Tracking Area List (TAL) in a wireless communication system. For description convenience below, the present invention uses terms and names defined in the Long Term Evolution (LTE) standards. However, the present invention is not limited by the terms and names, and is identically applicable to systems following other standards as well.

In the present invention, a Tracking Area (TA) where a Tracking Area Update (TAU) procedure is carried out frequently or is expected to do so is defined as one bundle with other tracking areas. According to this, in a case where tracking area update is carried out for one of the tracking areas managed as one bundle, the tracking areas included in the bundle are all included in a tracking area list. For example, in a case where a tracking area 'A' and a tracking area 'B' are defined as one bundle, if a Mobile Station (MS) performs a tracking area update procedure for the tracking area 'A', the tracking area 'A' and the tracking area 'B' are all included in a tracking area list of the MS. Accordingly, although the MS moves to the tracking area 'B', a tracking area update procedure for the tracking area 'B' is not performed. That is, the number of occurrence of the tracking area update procedure in the tracking area 'B' is decreased.

According to an exemplary embodiment of the present invention, the bundle of the tracking areas can be defined according to a Random Access CHannel (RACH) use frequency or failure frequency. This is because the mobility of an MS or a congestion level of a corresponding tracking area can be identified through a random access channel. According to another exemplary embodiment of the present invention, the bundle of the tracking areas can be defined according to a common mobile profile presented in tracking area lists of a plurality of MSs.

The exemplary embodiment determining the bundle of the tracking areas in accordance with the random access channel use frequency or failure frequency is described as follows. For description convenience below, in the present invention, a tracking area whose random access channel use frequency or failure frequency exceeds a threshold is called a 'congestion tracking area'.

Whether it is the congestion tracking area or not can be determined by a Base Station (BS) of a cell included in each tracking area. The BS can receive a report of information about random access channel use of an MS through a message received from the MS. In detail, the MS reports a signal transmission attempt count through a random access channel, an access failure count therethrough and the like to the BS. For example, the information about the random access channel use can be forwarded to the BS through a User Equipment (UE) information response message. Through this, the BS can collect statistics of an access attempt count through the random access channel, the access failure count therethrough and the like in its own cell, and can determine congestion or non-congestion using the collected statistics. That is, the BS determines a congestion determination metric for the random access channel in its own cell using the information reported from the MS, and compares the congestion determination metric with a threshold, thereby determining the congestion or non-congestion. Here, the congestion determination metric can include at least one of the access attempt count, the access failure count, an access failure rate and the like. If it is determined to be congestion, the BS notifies the occurrence of the congestion to an upper node, for instance, a node managing the mobility of an MS and a tracking area list thereof or a node controlling a network configuration. The upper node determines a congestion tracking area using reports from a plurality of BSs. For example, the node managing the mobility of the MS and the tracking area list thereof can be designated as a Mobility Management Entity (MME), and the node controlling the network configuration can be designated as a Self Organization Network (SON) server.

If the congestion tracking area is determined, the upper node defines the congestion tracking area as one bundle with neighbor tracking areas of the congestion tracking area. According to this, if an MS transmits a request for tracking area update in one of the neighbor tracking areas of the congestion tracking area, none the less because the MS does not transmit a request for tracking area update for the congestion tracking area, the MME includes the congestion tracking area as well as the neighbor tracking area of the congestion tracking area, in a tracking area list of the MS, and transmits the tracking area list that includes the congestion tracking area as well as the neighbor tracking area of the congestion tracking area. Unlike this, although the MS transmits a request for tracking area update in the congestion tracking area, the MME does not include the neighbor tracking areas of the congestion tracking area in the tracking area list of the MS, while including the congestion tracking area in the tracking area list of the MS. That is, the bundle of the congestion tracking area and the neighbor tracking areas of the congestion tracking area is defined as the relationship of one-way subordination of the congestion tracking area to the neighbor tracking areas. In other words, at the time of tracking area update according to entrance into the neighbor tracking area of the congestion tracking area, not merely the neighbor tracking area of the congestion tracking area but also the congestion tracking area is included in the tracking area list of the MS. Unlike this, at the time of tracking area update according to entrance into the congestion tracking area, no neighbor tracking areas of the congestion tracking area are included in the tracking area list of the MS, while the congestion tracking area is included in the tracking area list of the MS.

FIG. 1 illustrates an example of the distribution of a congestion tracking area in a wireless communication system according to an exemplary embodiment of the present invention.

In FIG. 1, thirteen hexagonal figures each illustrate one tracking area, and each tracking area includes at least one cell. FIG. 1 illustrates the trajectory 101 of an MS A and the trajectory 102 of an MS B. As illustrated in FIG. 1, a tracking area 7 and a tracking area 10 are congestion tracking areas. According to this, the tracking area 7 is managed as a bundle with tracking areas 2, 3, 6, 8, 11, and 12, and the tracking area 10 is managed as a bundle with tracking areas 5, 6, and 11. The bundle relationship is arranged as in Table 1 below.

TABLE 1

| Congestion tracking area | Neighbor tracking areas |
|---|---|
| TA_10 | TA_5, TA_6, TA_11 |
| TA_7 | TA_2, TA_3, TA_6, TA_8, TA_11, TA_12 |

If the MS A performs a tracking area update procedure in the tracking area 5, an MME includes not only the tracking area 5 but also the tracking area 10, in a tracking area list of the MS A. Due to this, although the MS A enters the tracking area 10 in the future, the MS A does not perform the tracking area update procedure for the tracking area 10, because the tracking area 10 has been already included in the tracking area list of the MS A. Also, if the MS B performs the tracking area update procedure in the tracking area 8, the MME includes not merely the tracking area 8 but also the tracking area 7, in a tracking area list of the MS B. Due to this, although the MS B enters the tracking area 7 in the future, the MS B does not perform the tracking area update procedure for the tracking area 7, because the tracking area 7 has been already included in the tracking area list of the MS B. The change of the tracking area lists of the MS A and the MS B is arranged as in Table 2 below.

TABLE 2

| | Trajectory | Tracking area list (size: 4) |
|---|---|---|
| MS A | 2 | TA2 |
| | 1 | TA2, TA1 |
| | 5 | TA2, TA1, [TA5, TA10] |

TABLE 2-continued

| | Trajectory | Tracking area list (size: 4) |
|---|---|---|
| | 10 | TA2, TA1, TA5, TA10 |
| | 11 | TA1, TA5, TA10, TA11 |
| MS B | 4 | TA4 |
| | 9 | TA4, TA9 |
| | 8 | TA4, TA9, [TA8, TA7] |
| | 12 | TA9, TA8, TA7, TA12 |
| | 7 | TA9, TA8, TA7, TA12 |
| | 3 | TA8, TA7, TA12, TA3 |

FIG. 2 illustrates tracking area list management using a congestion tracking area in a wireless communication system according to an exemplary embodiment of the present invention.

Referring to FIG. 2, in step 201, an MS 210 reports random access channel related information to a BS 220. The random access channel related information can include at least one of an access attempt count through a random access channel and an access failure count therethrough. For example, the report of the random access channel related information can be forwarded through a UE information response message.

Next, in step 203, the BS 220 receiving the random access channel related information from at least one of MSs including the MS 210 determines congestion or non-congestion for a random access channel provided in its own cell. In detail, the BS 220 determines a congestion determination metric for the random access channel using the reported random access channel related information, and compares the congestion determination metric with a threshold, thereby determining the congestion or non-congestion for the random access channel. Here, the congestion determination metric can include at least one of an access attempt count, an access failure count, and an access failure rate. In an exemplary embodiment, the present invention assumes that it is determined to be the congestion.

In step 205, the BS 220 determining that it is the congestion notifies the occurrence of the congestion to a SON server 240. In an exemplary embodiment, the congestion notified in step 205 represents the congestion of the cell unit. In FIG. 2, the BS 220 notifies the congestion to the SON server 240. Unlike this, the BS 220 can notify the congestion to an MME 230 according to another exemplary embodiment of the present invention. In this case, the MME 230 can again notify the congestion occurring in a cell of the BS 220 to the SON server 240. Or, the MME 230 can perform subsequent operations implemented in the SON server 240.

In step 207, the SON server 240 receiving the notification of the cell-unit congestion from at least one of BSs including the BS 220 determines a congestion tracking area. Since a tracking area includes at least one cell, the congestion or non-congestion of the tracking area unit can be determined by uniting the congestion or non-congestion of a plurality of cells. Accordingly, the SON server 240 determines the ranking of congestion in the tracking area unit and, according to the ranking, the SON server 240 determines at least one congestion tracking area. In an exemplary embodiment, the present invention assumes that at least one congestion tracking area is determined.

In step 209, the SON server 240 notifies the congestion tracking area to the MME 230. That is, the SON server 240 notifies the congestion tracking area to the MME 230 that manages tracking area lists of MSs. According to another exemplary embodiment of the present invention, this step can be omitted in a case where the SON server 240 is part of the MME 230 or the MME 230 performs the operation of the SON server 240 illustrated in FIG. 2.

In step 211, the MME 230 receiving the notification of the congestion tracking area defines the bundle relationship between tracking areas using the congestion tracking area. In detail, the MME 230 defines the congestion tracking area as one bundle with neighbor tracking areas of the congestion tracking area. However, the bundle of the congestion tracking area and the neighbor tracking areas is defined as the relationship of one-way subordination of the congestion tracking area to the neighbor tracking areas.

Next, in step 213, the MS 210 recognizes a change of a tracking area where the MS 210 is located, and transmits a request for tracking area update. That is, the MS 210 transmits a tracking area update request message that includes identification information of the tracking area where itself is now located. The tracking area update request message is forwarded to the MME 230 through the BS 220.

In step 215, the MME 230 receiving the tracking area update request updates a tracking area list of the MS 210. In detail, the MME 230 adds the tracking area indicated by the identification information that is included in the tracking area update request message, to the tracking area list of the MS 210. In an exemplary embodiment, when the tracking area list of the MS 210 includes tracking areas of number exceeding a window size, the MME 230 deletes the first included tracking area from the tracking area list of the MS 210. Particularly, when the identification information included in the tracking area update request message indicates a neighbor tracking area of the congestion tracking area, the MME 230 adds not merely the neighbor tracking area but also the congestion tracking area, to the tracking area list of the MS 210.

Next, in step 217, the MME 230 transmits a tracking area update accept message to the MS 210. The tracking area update accept message includes the updated tracking area list. The tracking area update accept message is forwarded to the MS 210 through the BS 220. According to this, the MS 210 replaces the tracking area list stored in the MS 210 with the updated tracking area list included in the tracking area update accept message. That is, the MS 210 updates the tracking area list stored in the MS 210. In an exemplary embodiment, in a case where the congestion tracking area is added to the tracking area list of the MS 210, the MS 210 does not perform a tracking area update procedure for the congestion tracking area, although entering the congestion tracking area in the future.

An exemplary embodiment determining a bundle according to a common mobile profile presented in tracking area lists of a plurality of MSs is described as follows. For description convenience below, the 'common mobile profile presented in the tracking area lists' is called a 'common profile' in the present invention.

The common profile can be determined using the tracking area lists of the plurality of MSs. To determine the existence or non-existence of the same mobile profile, an upper node, for example, an MME or a SON server compares the tracking area lists of the MSs stored in the MME, with each other. If the same mobile profile is identified in the tracking area lists of the plurality of MSs, the upper node defines the plurality of tracking areas included in the same mobile profile, as one bundle. Here, minimum how many tracking areas should be included to be worked as the mobile profile and in how many tracking area lists the mobile profile should be identified to be defined as the bundle can be different according to a concrete exemplary embodiment. According to this, if an MS transmits a request for tracking area update in one of the tracking areas included in the bundle, none the less because the MS does not transmit a request for tracking area update for the remnant tracking areas of the tracking areas included in the bundle, the MME includes not just the update-requested tracking area but also the remnant tracking areas, in a tracking area list of the MS, and transmits the tracking area list including all the tracking areas within the bundle. In this case, unlike a case of the congestion tracking area, all the tracking areas within the bundle based on the common profile have the mutual subordination relationship.

FIG. 3 illustrates an example of the trajectory of an MS in a wireless communication system according to an exemplary embodiment of the present invention.

In FIG. 3, seven hexagonal figures each illustrate one tracking area, and each tracking area includes at least one cell. FIG. 3 illustrates the trajectory 301 of an MS A and the trajectory 302 of an MS B. As illustrated in FIG. 3, the trajectory 301 of the MS A includes tracking areas 2, 1, 3, 6, and 7, and the trajectory 302 of the MS B includes tracking areas 5, 4, 3, 1, and 2. According to this, in a comparison between tracking area lists of the MS A and the MS B, the same mobile profile including the tracking areas 2, 1, and 3 are presented. Therefore, the tracking areas 2, 1, and 3 are defined as one bundle. The bundle relationship is arranged as in Table 3 below.

TABLE 3

| | Trajectory | Same mobile profile (bundle) |
|---|---|---|
| MS A | 2-1-3-6-7 | 2-1-3 |
| MS B | 5-4-3-1-2 | |

After the tracking areas 2, 1, and 3 are defined as one bundle as in Table 3 above, if the MS A and the MS B move as illustrated in FIG. 3, the tracking area lists of the MS A and the MS B are managed as follows. If the MS A performs a tracking area update procedure in the tracking area 2, an MME includes not only the tracking area 2 but also the tracking areas 1 and 3 included in the same bundle, in the tracking area list of the MS A. Due to this, although the MS A enters the tracking area 1 or 3 in the future, the MS A does not perform the tracking area update procedure for the tracking area 1 or 3, because the tracking areas 1 and 3 have been already included in the tracking area list of the MS A. Also, if the MS B performs the tracking area update procedure in the tracking area 3, the MME includes not only the tracking area 3 but also the tracking areas 1 and 2 included in the same bundle, in the tracking area list of the MS B. Due to this, although the MS B enters the tracking area 1 or 2 in the future, the MS B does not perform the tracking area update procedure for the tracking area 1 or 2, because the tracking areas 1 and 2 have been already included in the tracking area list of the MS B. The change of the tracking area lists of the MS A and the MS B is arranged as in Table 4 below.

TABLE 4

| | Trajectory | Tracking area lists (size: 4) |
|---|---|---|
| MS A | 2 | [TA2, TA1, TA3] |
| | 1 | TA2, TA1, TA3 |
| | 3 | TA2, TA1, TA3 |
| | 6 | TA2, TA1, TA3, TA6 |
| | 7 | TA1, TA3, TA6, TA7 |
| MS B | 5 | TA5 |
| | 4 | TA5, TA4 |

TABLE 4-continued

| Trajectory | Tracking area lists (size: 4) |
|---|---|
| 3 | TA4, [TA3, TA1, TA2] |
| 1 | TA4, TA3, TA1, TA2 |
| 2 | TA4, TA3, TA1, TA2 |

FIG. 4 illustrates tracking area list management using a common profile in a wireless communication system according to an exemplary embodiment of the present invention.

Referring to FIG. 4, in step 401, an MME 430 provides tracking area lists of a plurality of MSs to a SON server 440. The MME 430 stores and manages the tracking area lists of the plurality of MSs. In a case of FIG. 4, the MME 430 provides the tracking area lists to the SON server 440 because a common profile presented in the tracking area lists is determined by the SON server 440. According to another exemplary embodiment of the present invention, step 401 can be omitted in a case where the SON server 440 is part of the MME 430 or the MME 430 performs the operation of the SON server 440 illustrated in FIG. 4. Step 401 can be carried out when at least one tracking area list is updated, or periodically according to a predetermined time interval.

In step 403, the SON server 440 receiving provision of the tracking area lists of the plurality of MSs from the MME 430 determines the common profile presented in the tracking area lists of the plurality of MSs. In detail, to determine the existence or non-existence of the same mobile profile, the SON server 440 compares the tracking area lists of the plurality of MSs with each other. If the same mobile profile is identified in the tracking area lists of the plurality of MSs, the SON server 440 determines a plurality of tracking areas included in the same mobile profile, as the common profile. Here, minimum how many tracking areas should be included to be worked as the mobile profile and in how many tracking area lists the mobile profile should be identified to be defined as a bundle can be different according to a concrete exemplary embodiment. Compared to a case of FIG. 3, if the same mobile profile is identified in the two tracking area lists, the tracking areas belonging to the mobile profile are determined as the common profile.

After that, in step 405, the SON server 440 notifies the plurality of tracking areas belonging to the common profile, to the MME 430. That is, the SON server 440 informs the tracking areas belonging to the common profile, to the MME 430 that manages the tracking area lists of the MSs. According to another exemplary embodiment of the present invention, step 405 can be omitted in a case where the SON server 440 is part of the MME 430 or the MME 430 performs the operation of the SON server 440 illustrated in FIG. 4.

In step 407, the MME 430 receiving the notification of the common profile defines the bundle relationship between the tracking areas belonging to the common profile. In other words, the MME 430 defines the tracking areas belonging to the common profile, as one bundle. In this case, unlike a case of the congestion tracking area, all the tracking areas within the bundle based on the common profile have the mutual subordination relationship.

Next, in step 409, an MS 410 recognizes the change of a tracking area where the MS 410 is located, and transmits a request for tracking area update. That is, the MS 410 transmits a tracking area update request message including identification information of the tracking area where itself is now located. The tracking area update request message is forwarded to the MME 430 through a BS.

In step 411, the MME 430 receiving the tracking area update request message from the MS 410 updates a tracking area list of the MS 410. In detail, the MME 430 adds the tracking area indicated by the identification information that is included in the tracking area update request message, to the tracking area list of the MS 410. In an exemplary embodiment, when the tracking area list of the MS 410 includes tracking areas of a window size or more, the MME 430 deletes the first included tracking area from the tracking area list of the MS 410. Particularly, if the identification information included in the tracking area update request message indicates a tracking area included in the bundle based on the common profile, the MME 430 adds not only the tracking area included in the bundle but also the remnant tracking areas within the bundle, to the tracking area list of the MS 410.

Next, in step 413, the MME 430 transmits a tracking area update accept message to the MS 410. The tracking area update accept message includes the updated tracking area list of the MS 410. The tracking area update accept message is forwarded to the MS 410 through the BS. According to this, the MS 410 replaces the tracking area list stored in the MS 410 with the updated tracking area list included in the tracking area update accept message. That is, the MS 410 updates the tracking area list stored in the MS 410. In an exemplary embodiment, in a case where the remnant tracking area included in the bundle is added to the tracking area list of the MS 410, the MS 410 does not perform a tracking area update procedure for the remnant tracking area, although entering the remnant tracking area in the future.

The exemplary embodiment based on the congestion tracking area described with reference to FIG. 1 and FIG. 2 and the exemplary embodiment based on the common profile described with reference to FIG. 3 and FIG. 4 can be separately implemented, and can be simultaneously implemented as well. That is, a system can apply only one of the exemplary embodiment based on the congestion tracking area and the exemplary embodiment based on the common profile, or can simultaneously apply all of them.

A case of simultaneously applying all of the exemplary embodiment based on the congestion tracking area and the exemplary embodiment based on the common profile is described as follows.

FIG. 5 illustrates an example of the distribution of a congestion tracking area and the trajectory of an MS in a wireless communication system according to an exemplary embodiment of the present invention.

In FIG. 5, seven hexagonal figures each illustrate one tracking area, and each tracking area includes at least one cell. FIG. 5 illustrates the trajectory 501 of an MS A and the trajectory 502 of an MS B. As illustrated in FIG. 5, the trajectory 501 of the MS A includes tracking areas 2, 1, 3, 6, and 7, and the trajectory 502 of the MS B includes tracking areas 5, 4, 3, 1, and 2. According to this, in a comparison between tracking area lists of the MS A and the MS B, the same mobile profile including the tracking areas 2, 1, and 3 are presented. Therefore, the tracking areas 2, 1, and 3 are defined as one bundle. The bundle relationship is arranged as in Table 5 below.

TABLE 5

| | Trajectory | Same mobile profile (bundle) |
|---|---|---|
| MS A | 2-1-3-6-7 | 2-1-3 |
| MS B | 5-4-3-1-2 | |

As illustrated in FIG. 5, the tracking area 6 is a congestion tracking area. According to this, the tracking area 6 is managed as a bundle with the tracking areas 3, 4, and 7. The bundle relationship is arranged as in Table 6 below.

TABLE 6

| Congestion tracking area | Neighbor tracking areas |
|---|---|
| TA_6 | TA_3, TA_4, TA_7 |

After Table 5 above and Table 6 above and the bundle relationship are defined, when the MS A and the MS B move as illustrated in FIG. 5, the tracking area lists of the MS A and the MS B are managed as follows. If the MS A performs a tracking area update procedure in the tracking area 2, an MME includes not only the tracking area 2 but also the tracking areas 1 and 3 included in the same bundle, in the tracking area list of the MS A. Due to this, although the MS A enters the tracking area 1 or 3 in the future, the MS A does not perform the tracking area update procedure for the tracking area 1 or 3, because the tracking areas 1 and 3 have been already included in the tracking area list of the MS A. In an exemplary embodiment, even the tracking area 6 is included in the tracking area list of the MS A because the tracking area 3 is a neighbor of the tracking area 6 that is the congestion tracking area. Due to this, although the MS A enters the tracking area 6 in the future, the MS A does not perform the tracking area update procedure for the tracking area 6, because the tracking area 6 has been already included in the tracking area list of the MS A. Also, if the MS B performs the tracking area update procedure in the tracking area 4, the MME includes not only the tracking area 4 but also the tracking area 6 that is the congestion tracking area, in the tracking area list of the MS B. After that, if the MS B performs the tracking area update procedure in the tracking area 3, the MME includes not only the tracking area 3 but also the tracking areas 1 and 2 included in the same bundle, in the tracking area list of the MS B. Due to this, although the MS B enters the tracking area 1 or 2 in the future, the MS B does not perform the tracking area update procedure for the tracking area 1 or 2, because the tracking areas 1 and 2 have been already included in the tracking area list of the MS B. The change of the tracking area lists of the MS A and the MS B is arranged as in Table 7 below.

TABLE 7

| | Trajectory | Tracking area lists (size: 4) |
|---|---|---|
| MS A | 2 | [TA2, TA1, TA3, TA6] |
| | 1 | TA2, TA1, TA3, TA6 |
| | 3 | TA2, TA1, TA3, TA6 |
| | 6 | TA2, TA1, TA3, TA6 |
| | 7 | TA1, TA3, TA6, TA7 |
| MS B | 5 | TA5 |
| | 4 | TA5, [TA4, TA6] |
| | 3 | TA6, [TA3, TA1, TA2] |
| | 1 | TA6, TA3, TA1, TA2 |
| | 2 | TA6, TA3, TA1, TA2 |

FIG. 6 illustrates tracking area list management using a congestion tracking area and a common profile in a wireless communication system according to an exemplary embodiment of the present invention.

Referring to FIG. 6, in step 601, a SON server 640 notifies a congestion tracking area to an MME 630. The congestion tracking area can be determined by a BS. In detail, the BS determines a congestion determination metric for a random access channel using information reported from an MS, and compares the congestion determination metric with a threshold, thereby being capable of determining congestion or non-congestion. And then, in step 603, the SON server 640 notifies tracking areas belonging to a common profile, to the MME 630. The common profile can be determined by comparing tracking area lists of a plurality of MSs. According to another exemplary embodiment of the present invention, step 601 and step 603 can be omitted in a case where the SON server 640 is part of the MME 630 or the MME 630 performs the operation of the SON server 640 illustrated in FIG. 6.

After that, in step 605, the MME 630 defines the bundle relationship. The MME 630 receiving the notification of the congestion tracking area defines the bundle relationship between tracking areas using the congestion tracking area. In detail, the MME 630 defines the congestion tracking area as one bundle with neighbor tracking areas of the congestion tracking area. However, the bundle of the congestion tracking area and the neighbor tracking areas of the congestion tracking area is defined as the relationship of one-way subordination of the congestion tracking area to the neighbor tracking areas. Also, the MME 630 receiving the notification of the common profile defines the bundle relationship between the tracking areas belonging to the common profile. In other words, the MME 630 defines the tracking areas belonging to the common profile, as one bundle. In this case, unlike a case of the congestion tracking area, all the tracking areas within the bundle based on the common profile have the mutual subordination relationship.

Next, in step 607, the MME 630 receives a tracking area update request message. The tracking area update request message is generated when an MS recognizes the change of a tracking area where the MS is located. In this case, the MS transmits the BS the tracking area update request message that includes identification information of a tracking area where the MS is now located, and the BS forwards the tracking area update request message to the MME 630.

After that, in step 609, the MME 630 receiving the tracking area update request message determines whether the update-requested tracking area (i.e., the tracking area indicated by the identification information that is included in the tracking area update request message) is a neighbor of the congestion tracking area, and whether the update-requested tracking area has been included in the common profile. In other words, the MME 630 determines whether the update-requested tracking area has the bundle relationship.

If it is determined in step 609 that the update-requested tracking area is the neighbor of the congestion tracking area and simultaneously, has been included in the common profile, the MME 630 proceeds to step 611 and includes the congestion tracking area, the plurality of tracking areas belonging to the common profile, and the update-requested tracking area, in the tracking area list of the MS. Further, if it is determined in step 609 that the update-requested tracking area is the neighbor of the congestion tracking area but has not been included in the common profile, the MME 630 proceeds to step 613 and includes the congestion tracking area and the updated-requested tracking area, in the tracking area list of the MS. Further, if it is determined in step 609 that the update-requested tracking area is not the neighbor of the congestion tracking area but has been included in the common profile, the MME 630 proceeds to step 615 and includes the plurality of tracking areas belonging to the common profile and the update-requested tracking area, in the tracking area list of the MS. Further, if it is determined in step 609 that the update-requested tracking area is neither the neighbor of the congestion tracking area nor has been included in the common profile, the MME 630 proceeds to step 617 and includes the update-requested tracking area in the tracking area list of the MS.

Next, although not illustrated, the MME 630 can transmit a tracking area update accept message to the MS. The tracking area update accept message includes an updated tracking area list. According to this, the MS replaces the tracking area list stored in the MS with the updated tracking area list included in the tracking area update accept message. That is, the MS updates the tracking area list stored in the MS. In an exemplary embodiment, in a case where the congestion tracking area or the plurality of tracking areas belonging to the common profile are added to the tracking area list of the MS, the MS does not perform a tracking area update procedure for the congestion tracking area or the tracking area belonging to the common profile, although entering the congestion tracking area or the tracking area belonging to the common profile in the future.

Operations and constructions of an MS, a BS, an MME, and a SON server for managing a tracking area list as above are described below in detail with reference to the drawings.

FIG. 7 illustrates an operation procedure of an MS in a wireless communication system according to an exemplary embodiment of the present invention.

Referring to FIG. 7, in step 701, the MS determines whether it has entered a tracking area not included in a tracking area list of the MS. Because a BS broadcasts information notifying a tracking area to which its own cell belongs, for example, identification information, the MS can be aware of a tracking area of a current location through the information broadcasted in the BS. The MS stores the tracking area list including tracking areas where paging to itself is performed and, when entering the tracking area not included in the tracking area list of the MS, the MS performs a tracking area update procedure for the tracking area not included in the tracking area list of the MS.

If it is determined in step 701 that the MS enters the tracking area not included in the tracking area list, the MS proceeds to step 703 and transmits a tracking area update request message. The tracking area update request message includes identification information of a current tracking area. The identification information of the tracking area can include a service provider identifier and a tracking area identifier that a service provider assigns. The service provider identifier can be called a Public Land Mobile Network IDentifier (PLMN ID), and the tracking area identifier can be called a Tracking Area Code (TAC). The tracking area update request message is transmitted to the BS through a wireless channel, and is forwarded to an MME, which manages tracking area lists of MSs, through a backhaul network.

Next, the MS proceeds to step 705 and receives a tracking area update accept message that includes a tracking area list to which a plurality of tracking areas are added. That the plurality of tracking areas are added means that at least one of other tracking areas having the bundle relationship with the tracking area indicated by the tracking area update request message transmitted in step 703 exists. For instance, the tracking area indicated by the tracking area update request message can be a neighbor tracking area of a congestion tracking area. In this case, the plurality of tracking areas include the tracking area indicated by the tracking area update request message and the congestion tracking area. Or, the tracking area indicated by the tracking area update request message can be a tracking area belonging to a common profile. In this case, the plurality of tracking areas include the tracking area belonging to the common profile.

After that, the MS proceeds to step 707 and updates the tracking area list. In other words, the MS replaces a previously stored tracking area list with the tracking area list included in the tracking area update accept message. According to this, although the MS enters other tracking area included in the same bundle as the congestion tracking area or the tracking area indicated by the tracking area update request message in the future, the MS does not perform the tracking area update procedure for the other tracking area, because the other tracking area has been included in the tracking area list.

FIG. 8 illustrates an operation procedure of a BS in a wireless communication system according to an exemplary embodiment of the present invention.

Referring to FIG. 8, in step 801, the BS collects random access channel related information reported from an MS. The random access channel related information can include at least one of a signal transmission attempt count through a random access channel and an access failure count therethrough. For example, the random access channel related information can be received through a UE information response message.

After that, the BS proceeds to step 803 and determines if congestion in the random access channel takes place. That is, the BS checks statistics of an access attempt count through the random access channel, the access failure count therethrough and the like in its own cell, and determines congestion or non-congestion using the collected statistics. In detail, the BS determines a congestion determination metric for the random access channel in its own cell using the information reported from the MS, and compares the congestion determination metric with a threshold, thereby determining the congestion or non-congestion. Here, the congestion determination metric can include at least one of the access attempt count, the access failure count, and an access failure rate.

If the congestion in the random access channel takes place, the BS proceeds to step 805 and reports the occurrence of the congestion to an upper node. For example, the upper node can be an MME or a SON server. In an exemplary embodiment, the congestion reported by the BS is the congestion of the cell unit.

FIG. 9 illustrates an operation procedure of an MME in a wireless communication system according to an exemplary embodiment of the present invention.

Referring to FIG. 9, in step 901, the MME defines the bundle relationship between tracking areas. The bundle relationship means the relationship of, although there is a request for tracking area update for one tracking area among a plurality of tracking areas, including not only the update-requested tracking area but also the remnant tracking areas together in a tracking area list of an MS. The bundle relationship is defined based on a congestion tracking area or a common profile. In a case of the congestion tracking area, the bundle relationship is defined between the congestion tracking area and neighbor tracking areas of the congestion tracking area. However, the bundle relationship based on the congestion tracking area has the relationship of one-way subordination of the congestion tracking area to the neighbor tracking areas. In a case of the common profile, the bundle relationship is defined between a plurality of superposition tracking areas included in the common profile. The bundle relationship based on the common profile has the mutual subordination relationship.

Prior to definition of the bundle relationship, it is preferable that the MME selects the congestion tracking area and the common profile. According to an exemplary embodiment of the present invention, the congestion tracking area and the common profile can be determined by a SON server and then be notified to the MME. In this case, although not illustrated in FIG. 9, prior to step 901, the MME receives a notification of at least one of the congestion tracking area and the common profile from the SON server. According to another exemplary embodiment of the present invention, the congestion tracking area and the common profile can be determined by the MME. In this case, although not illustrated in FIG. 9, prior to step 901, the MME determines at least one of the congestion tracking area and the common profile. A detailed process of determining at least one of the congestion tracking area and the common profile is described later with reference to FIG. 10 below.

After that, the MME proceeds to step 903 and determines if a tracking area update request message is received from an MS. That is, the MME determines if there is a request for a tracking area update procedure from the MS. The tracking area update request message includes identification information of a tracking area where the MS is now located. The identification information of the tracking area can include a service provider identifier and a tracking area identifier that a service provider assigns. The service provider identifier can be called a PLMN ID, and the tracking area identifier can be called a TAC.

If it is determined in step 903 that the tracking area update request message is received from the MS, the MME proceeds to step 905 and determines whether a tracking area having the bundle relationship with the update-requested tracking area exists. Here, the update-requested tracking area means the tracking area indicated by the identification information that is included in the tracking area update request message. That is, the MME determines if the update-requested tracking area is the neighbor tracking area of the congestion tracking area or is the tracking area belonging to the common profile.

If it is determined in step 905 that the tracking area having the bundle relationship with the updated-requested tracking area does not exist, the MME proceeds to step 907 and adds the update-requested tracking area to the tracking area list of the MS. That is, the MME adds only the update-requested tracking area to the tracking area list of the MS because the tracking area having the bundle relationship with the update-requested tracking area does not exist.

In contrast, if it is determined in step 905 that the tracking area having the bundle relationship with the update-requested tracking area exists, the MME proceeds to step 909 and adds the update-requested tracking area and at least one tracking area having the bundle relationship with the update-requested tracking area, to the tracking area list of the MS. For example, if the update-requested tracking area is the neighbor tracking area of the congestion tracking area, the MME adds not merely the update-requested tracking area but also the congestion tracking area, to the tracking area list of the MS. Or, if the update-requested tracking area is the tracking area belonging to the common profile, the MME adds not only the update-requested tracking area but also the remnant at least one congestion tracking area belonging to the common profile, to the tracking area list of the MS. In an exemplary embodiment, when the tracking area list of the MS includes tracking areas of number exceeding a maximum window size, the MME deletes the first included tracking area from the tracking area list of the MS.

Next, the MME proceeds to step 911 and transmits the MS a tracking area update accept message including the updated tracking area list. According to this, although the MS enters other tracking area included in the same bundle as the congestion tracking area or the tracking area indicated by the tracking area update request message in the future, the MS does not perform the tracking area update procedure for the other tracking area, because the other tracking area has been included in the updated tracking area list.

FIG. 10 illustrates an operation procedure of a SON server in a wireless communication system according to an exemplary embodiment of the present invention.

Referring to FIG. 10, in step 1001, the SON server collects information for determining a congestion tracking area or a common profile. For instance, the information for determining the congestion tracking area includes a cell-unit congestion occurrence report for a random access channel determined by a BS. The cell-unit congestion occurrence report can be received from the BS or an MME. For example, the information for determining the common profile includes tracking area lists of a plurality of MSs.

Next, the SON server proceeds to step 1003 and determines the congestion tracking area or the common profile. And, the SON server notifies the congestion tracking area or the common profile to the MME. That is, the SON server generates information for determining the bundle relationship between tracking areas, and transmits this to the MME. Since the tracking area includes at least one cell, the congestion tracking area can be determined by uniting the congestion or non-congestion of a plurality of cells. Therefore, the SON server unites cell-unit congestion or non-congestion to determine the ranking of congestion in the tracking area unit, and determines at least one congestion tracking area according to the ranking. Also, to determine the existence or non-existence of the same mobile profile, the SON server compares tracking area lists of the plurality of MSs with each other. If the same mobile profile is identified in the tracking area lists of the plurality of MSs, the SON server determines a plurality of tracking areas included in the same mobile profile, as the common profile. Here, minimum how many tracking areas should be included to be worked as the mobile profile and in how many tracking area lists the mobile profile should be identified to be defined as a bundle can be different according to a concrete exemplary embodiment.

The operation procedure illustrated in FIG. 10 is an operation procedure of a SON server. But, an MME can perform the operation procedure of the SON server illustrated in FIG. 10 according to another exemplary embodiment of the present invention. In this case, step 1003 of notifying the congestion tracking area or the common profile to the MME can be omitted.

FIG. 11 illustrates a construction of an MS in a wireless communication system according to an exemplary embodiment of the present invention.

As illustrated in FIG. 11, the MS includes a Radio Frequency (RF) processor 1110, a MOdulator/DEModulator (MODEM) 1120, a storage unit 1130, and a controller 1140.

The RF processor 1110 performs a function for transmitting/receiving a signal through a wireless channel, such as signal band conversion, amplification and the like. That is, the RF processor 1110 up converts a baseband signal provided from the modem 1120 into an RF band signal and transmits the RF band signal through an antenna, and down converts an RF band signal received through the antenna into a baseband signal. For example, the RF processor 1110 can include an amplifier, a mixer, an oscillator, a Digital to Analog Converter (DAC), an Analog to Digital Converter (ADC) and the like.

The modem 1120 performs a function of conversion between a baseband signal and a bit stream according to a physical layer standard of a system. For example, at data transmission, the modem 1120 generates complex symbols by encoding and modulating a transmission bit stream, maps the complex symbols to subcarriers, and constructs Orthogonal Frequency Division Multiplexing (OFDM) symbols through Inverse Fast Fourier Transform (IFFT) operation and Cyclic Prefix (CP) insertion. Also, at data reception, the modem 1120 divides a baseband signal provided from the RF processor 1110 in the OFDM symbol unit, restores signals mapped to subcarriers through demodulation and decoding.

The storage unit 1130 stores data of a basic program for an operation of the MS, an application, user contents, setting information and the like. And, the storage unit 1130 provides stored data according to a request of the controller 1140. Particularly, the storage unit 1130 stores a tracking area list of the MS provided from the system.

The controller 1140 controls general operations of the MS. For example, the controller 1140 configures downlink data, provides the downlink data to the modem 1120, and interprets uplink data provided from the modem 1120. Particularly, according to an exemplary embodiment of the present invention, the controller 1140 performs a tracking area update procedure according to the change of a tracking area of a current location. An operation of the controller 1140 for the tracking area update procedure is described as follows.

If the MS enters a tracking area not included in the tracking area list stored in the storage unit 1130, the controller 1140 transmits a tracking area update request message through the modem 1120 and the RF processor 1110, and receives a tracking area update accept message including an updated tracking area list. The updated tracking area list is in a state of newly adding a plurality of tracking areas according to an exemplary embodiment of the present invention. That the plurality of tracking areas are added means that at least one of other tracking areas having the bundle relationship with a tracking area indicated by the tracking area update request message transmitted in the controller 1140 exists. For example, the tracking area indicated by the tracking area update request message can be a neighbor tracking area of a congestion tracking area. In this case, the plurality of tracking areas include the tracking area indicated by the tracking area update request message and the congestion tracking area. Or, the tracking area indicated by the tracking area update request message can be a tracking area belonging to a common profile. In this case, the plurality of tracking areas include the tracking area belonging to the common profile. According to this, the controller 1140 replaces the tracking area list stored in the storage unit 1130 with the new tracking area list included in the tracking area update accept message. That is, the controller 1140 updates the tracking area list stored in the storage unit 1130. According to this, although the MS enters other tracking area included in the same bundle as the congestion tracking area or the tracking area indicated by the tracking area update request message in the future, the controller 1140 does not perform the tracking area update procedure for the other tracking area, because the other tracking area has been included in the updated tracking area list.

FIG. 12 illustrates a construction of a BS in a wireless communication system according to an exemplary embodiment of the present invention.

As illustrated in FIG. 12, the BS includes an RF processor 1210, a modem 1220, a backhaul communication unit 1230, a storage unit 1240, and a controller 1250.

The RF processor 1210 performs a function for transmitting/receiving a signal through a wireless channel, such as signal band conversion, amplification and the like. That is, the RF processor 1210 up converts a baseband signal provided from the modem 1220 into an RF band signal and transmits the RF band signal through an antenna, and down converts an RF band signal received through the antenna into a baseband signal. For example, the RF processor 1210 can include an amplifier, a mixer, an oscillator, a DAC, an ADC and the like.

The modem 1220 performs a function of conversion between a baseband signal and a bit stream according to a physical layer standard of a system. For example, at data transmission, the modem 1220 generates complex symbols by encoding and modulating a transmission bit stream, maps the complex symbols to subcarriers, and constructs OFDM symbols through IFFT operation and CP insertion. Also, at data reception, the modem 1220 divides a baseband signal provided from the RF processor 1210 in the OFDM symbol unit, restores signals mapped to subcarriers through FFT operation, and restores a reception bit stream through demodulation and decoding.

The backhaul communication unit 1230 provides an interface for performing communication with other nodes within the system. That is, the backhaul communication unit 1230 converts a bit stream transmitted from the BS to other nodes, for example, an MME, a SON server and the like, into a physical signal, and converts a physical signal received from the other node into a bit stream. The storage unit 1240 stores data of a basic program for an operation of the BS, an application, setting information and the like. And, the storage unit 1240 provides stored data according to a request of the controller 1250.

The controller 1250 controls general operations of the BS. For instance, the controller 1250 configures downlink data, provides the downlink data to the modem 1220, and interprets uplink data provided from the modem 1220. Also, the controller 1250 includes a congestion determiner 1252 determining the congestion or non-congestion of a random access channel provided in the BS. Particularly, according to an exemplary embodiment of the present invention, if the congestion is determined by the congestion determiner 1252, the controller 1250 notifies the occurrence of the congestion to an upper node through the backhaul communication unit 1230. An operation of the controller 1250 for notifying the occurrence of the congestion is described as follows.

First, the controller 1250 collects random access channel related information reported from an MS. The random access channel related information can include at least one of a signal transmission attempt count through the random access channel and an access failure count therethrough. For example, the random access channel related information can be received through a UE information response message. And, the controller 1250 checks statistics of an access attempt count through the random access channel, the access failure count therethrough and the like in its own cell using the information reported from the MS, and determines the congestion or non-congestion using the collected statistics. In detail, the controller 1250 determines a congestion determination metric for the random access channel, and compares the congestion determination metric with a threshold, thereby determining the congestion or non-congestion. Here, the congestion determination metric can include at least one of the access attempt count, the access failure count, and an access failure rate. And, if the congestion in the random access channel is determined, the controller 1250 reports the occurrence of the congestion to the upper node through the backhaul communication unit 1230. For example, the upper node can be an MME or a SON server.

FIG. 13 illustrates a construction of an MME in a wireless communication system according to an exemplary embodiment of the present invention.

As illustrated in FIG. 13, the MME includes a communication unit 1310, a storage unit 1320, and a controller 1330.

The communication unit 1310 provides an interface for performing communication with other nodes within a system. That is, the communication unit 1310 converts a bit stream, which is transmitted from the MME to other nodes, for example, a BS, a SON server and the like, into a physical signal, and converts a physical signal received from the other node into a bit stream. The storage unit 1320 stores data of a basic program for an operation of the MME, setting information and the like. Particularly, the storage unit 1320 stores tracking area lists of MSs and bundle relationship information between tracking areas. And, the storage unit 1320 provides stored data according to a request of the controller 1330.

The controller 1330 controls general operations of the MME. The controller 1330 includes a bundle manager 1332 for determining the bundle relationship between the tracking areas. Particularly, according to an exemplary embodiment of the present invention, the controller 1330 manages the tracking area lists of the MSs according to the bundle relationship determined by the bundle manager 1332. An operation of the controller 1330 for managing the tracking area lists of the MSs is described as follows.

Referring to FIG. 9, the controller 1330 defines the bundle relationship between the tracking areas. The bundle relationship can be defined based on a congestion tracking area or based on a common profile. Prior to definition of the bundle relationship, it is preferable that the controller 1330 selects the congestion tracking area and the common profile. According to an exemplary embodiment of the present invention, the congestion tracking area and the common profile can be determined by a SON server and then be notified to the MME. In this case, the controller 1330 receives a notification of at least one of the congestion tracking area and the common profile from the SON server through the communication unit 1310. According to another exemplary embodiment of the present invention, the congestion tracking area and the common profile can be determined by the MME. In this case, the controller 1330 determines at least one of the congestion tracking area and the common profile.

After the bundle relationship is defined, if a tracking area update request message is received from an MS, the controller 1330 determines if a tracking area having the bundle relationship with an update-requested tracking area exists. That is, the controller 1330 determines whether the update-requested tracking area is a neighbor tracking area of the congestion tracking area or is a tracking area belonging to the common profile. If the tracking area having the bundle relationship with the update-requested tracking area exists, the controller 1330 adds the update-requested tracking area and at least one tracking area having the bundle relationship with the update-requested tracking area, to a tracking area list of the MS. For example, when the update-requested tracking area is the neighbor tracking area of the congestion tracking area, the controller 1330 adds not only the update-requested tracking area but also the congestion tracking area, to the tracking area list of the MS. Or, if the update-requested tracking area is the tracking area belonging to the common profile, the controller 1330 adds not merely the update-requested tracking area but also the remnant at least one congestion tracking area belonging to the common profile, to the tracking area list of the MS. In an exemplary embodiment, when the tracking area list includes tracking areas of number exceeding a maximum window size, the controller 1330 deletes the first included tracking area from the tracking area list of the MS. And, the controller 1330 stores the updated tracking area list of the MS in the storage unit 1320, and transmits a tracking area update accept message including the updated tracking area list to the MS.

FIG. 14 illustrates a construction of a SON server in a wireless communication system according to an exemplary embodiment of the present invention.

As illustrated in FIG. 14, the SON server includes a communication unit 1410, a storage unit 1420, and a controller 1430.

The communication unit 1410 provides an interface for performing communication with other nodes within a system. That is, the communication unit 1410 converts a bit stream transmitted from the SON server to other nodes, for example, a BS, an MME and the like, into a physical signal, and converts a physical signal received from the other node into a bit stream. The storage unit 1420 stores data of a basic program for an operation of the SON server, setting information and the like. Particularly, the storage unit 1420 stores cell-unit congestion information and tracking area lists of MSs. And, the storage unit 1420 provides stored data according to a request of the controller 1430.

The controller 1430 controls general operations of the SON server. The controller 1430 includes a congestion determiner 1432 determining the congestion or non-congestion of the tracking area unit and a profile analyzer 1434 determining a common profile. For the sake of determining of the congestion tracking area, the controller 1430 collects information for determining the congestion tracking area. For example, the information for determining the congestion tracking area includes a cell-unit congestion occurrence report for a random access channel determined by a BS. The cell-unit congestion occurrence report can be received from the BS or MME. Also, to determine the common profile, the controller 1430 collects information for determining the common profile. For example, the information for determining the common profile includes tracking area lists of a plurality of MSs. And, the controller 1430 notifies the congestion tracking area or common profile to the MME through the communication unit 1410.

The congestion determiner 1432 unites cell-unit congestion or non-congestion to determine the ranking of congestion in the tracking area unit, and determines at least one congestion tracking area according to the ranking. The profile analyzer 1434 compares tracking area lists of a plurality of MSs with each other to determine the existence or non-existence of the same mobile profile. If the same mobile profile is identified in the tracking area lists of the plurality of MSs, the profile analyzer 1434 determines a plurality of tracking areas included in the same mobile profile, as the common profile. Here, minimum how many tracking areas should be included to be worked as the mobile profile and in how many tracking area lists the mobile profile should be identified to be defined as a bundle can be different according to a concrete exemplary embodiment.

As described above, exemplary embodiments of the present invention manage a plurality of tracking areas as a bundle and include the tracking areas of the bundle relationship in a tracking area list of an MS before the MS enter the tracking area, thereby preventing a situation in which a tracking area update procedure is intensively performed in a specific tracking area, and enhancing a paging success rate.

Embodiments of the present invention according to the claims and description in the specification can be realized in the form of hardware, software or a combination of hardware and software.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A method for an operation of a terminal in a wireless communication system, the method comprising:
transmitting a first message for requesting first information for a tracking area;
receiving, in response to the first message, a second message including second information for the tracking area and at least one other tracking area; and
generating a first list by adding the tracking area and the at least one other tracking area to a second list of the terminal,
wherein the at least one other tracking area comprises at least one of
a first tracking area adjacent to the tracking area, in which a number of transmissions of random access signals exceeds a threshold, or a second tracking area, wherein the tracking area and the second tracking area are common in tracking area lists of a plurality of terminals.

2. The method of claim 1, wherein the first tracking area is a congestion tracking area where at least one of an access attempt count through a random access channel, an access failure count, or an access failure rate exceeds a threshold.

3. The method of claim 1, wherein the first tracking area and the second tracking area are comprised in a common mobile profile presented in the tracking area lists of the plurality of terminals.

4. A method for operation of a node managing a mobility of a terminal in a wireless communication system, the method comprising:
- receiving a first message for requesting first information for a tracking area;
- generating, in response to the first message, a first list by adding the tracking area and at least one other tracking area to a second list of the terminal; and
- transmitting a second message including second information regarding the first list,
- wherein the at least one other tracking area comprises at least one of
- a first tracking area adjacent to the tracking area, in which a number of transmissions of random access signals exceeds a threshold, or a second tracking area, wherein the tracking area and the second tracking area are common in tracking area lists of a plurality of terminals.

5. The method of claim 4, wherein the
- first tracking area is a congestion tracking area where at least one of an access attempt count through a random access channel, an access failure count, or an access failure rate exceeds a threshold.

6. The method of claim 5, further comprising:
- receiving at least one report on cell congestion occurrence from each of at least one base station (BS); and
- determining the congestion tracking area based on the at least one report.

7. The method of claim 6, wherein the determining of the congestion tracking area comprises:
- determining a ranking of congestion for each of tracking areas based on the at least one report; and
- determining the congestion tracking area among the tracking areas according to the ranking.

8. The method of claim 6, wherein the determining of the congestion tracking area comprises receiving a notification of the congestion tracking area from a node controlling a network configuration.

9. The method of claim 5, wherein the tracking area and the second tracking area are comprised in a common mobile profile presented in the tracking area lists of the plurality of terminals.

10. The method of claim 9, further comprising:
- comparing the tracking area lists of each of the plurality of terminals with each other; and
- identifying the same mobile profile presented in the tracking area lists of each of the plurality of terminals.

11. The method of claim 9, further comprising receiving a notification of the common mobile profile from a node controlling a network configuration.

12. A method of operation of a node controlling a network configuration in a wireless communication system, the method comprising:
- generating first information to determine a group comprising a tracking area and a at least one other tracking area; and
- transmitting the first information to a node managing a mobility of terminals,
- wherein the node managing a mobility of terminals transmits a first message including second information for the tracking area and the at least one other tracking area responsive to receiving a second message for requesting third information for the tracking area, and
- wherein the at least one other tracking area comprises at least one of
- a first tracking area adjacent to the tracking area, in which a number of transmissions of random access signals exceeds a threshold, or a second tracking area, wherein the tracking area and the second tracking area are common in tracking area lists of a plurality of terminals.

13. The method of claim 12, wherein the generating of the first information comprises:
- receiving at least one report on cell congestion occurrence from each of at least one base station (BS); and
- determining a congestion tracking area based on the at least one report,
- wherein the first tracking area is the congestion tracking area.

14. The method of claim 13, wherein the determining of the congestion tracking area comprises:
- determining a ranking of congestion for each of tracking areas based on the at least one report; and
- determining the congestion tracking area among the tracking areas according to the ranking.

15. The method of claim 12, wherein the generating of the first information comprises:
- receiving the tracking area lists of each of the plurality of terminals from the node managing a mobility of terminals; and
- identifying the same mobile profile presented in the tracking area lists of each of the plurality of terminals.

16. An apparatus for an operation of a terminal in a wireless communication system, the apparatus comprising:
- at least one transceiver configured to:
  - transmit a first message for requesting first information for a tracking area;
  - receive, in response to the first message, a second message including second information for the tracking area and at least one other tracking area; and
- at least one processor configured to generate a first list by adding the tracking area and the at least one other tracking area to a second list of the terminal,
- wherein the at least one other tracking area comprises at least one of a first tracking area adjacent to the tracking area, in which a number of transmissions of random access signals exceeds a threshold, or a second tracking area, wherein the tracking area and the second tracking area are common in tracking area lists of a plurality of terminals.

17. The apparatus of claim 16, wherein the first tracking area is a congestion tracking area where at least one of an access attempt count through a random access channel, an access failure count, or an access failure rate exceeds a threshold.

18. The apparatus of claim 16, wherein the tracking area and the second tracking area are comprised in a common mobile profile presented in the tracking area lists of the plurality of terminals.

19. An apparatus for operation of a node managing a mobility of a terminal in a wireless communication system, the apparatus comprising:
- at least one transceiver configured to receive a first message for requesting first information for a tracking area; and
- at least one processor configured to generate, in response to the first message, a first list by adding the tracking area and at least one other tracking area to a second list of the terminal,
- wherein the at least one transceiver is further configured to transmit a second message including second information regarding the first list,
- wherein the at least one other tracking area comprises at least one of a first tracking area adjacent to the tracking area, in which a number of transmissions of random access signals exceeds a threshold, or a second tracking area, wherein the tracking area and the second tracking area are common in tracking area lists of a plurality of terminals.

20. The apparatus of claim 19, wherein the first tracking area is a congestion tracking area where at least one of an access attempt count through a random access channel, an access failure count, or an access failure rate exceeds a threshold.

21. The apparatus of claim 20, wherein the at least one transceiver is further configured to receive at least one report on cell congestion occurrence from each of at least one base station (BS),
wherein the at least one processor is further configured to determine the congestion tracking area based on the at least one report.

22. The apparatus of claim 21, wherein the at least one processor is further configured to determine a ranking of congestion for each of tracking areas based on the at least one report, and determine the congestion tracking area among the tracking areas according to the ranking.

23. The apparatus of claim 20, wherein the at least one transceiver is further configured to receive a notification of the congestion tracking area from a node controlling a network configuration.

24. The apparatus of claim 19, wherein the tracking area and the second tracking area are comprised in a common mobile profile presented in the tracking area lists of the plurality of terminals.

25. The apparatus of claim 24, wherein the at least one processor is further configured to compare the tracking area lists of each of the plurality of terminals with each other, and identify the same mobile profile presented in the tracking area lists of each of the plurality of terminals.

26. The apparatus of claim 24, wherein the at least one transceiver is further configured to receive a notification of the common mobile profile from a node controlling a network configuration.

27. An apparatus of operation of a node controlling a network configuration in a wireless communication system, the apparatus comprising:

at least one processor configured to generate first information to determine a group comprising a tracking area and at least one other tracking area; and at least one transceiver configured to transmit the first information to a node managing a mobility of terminals, wherein the node managing a mobility of terminals transmits a first message including second information for the tracking area and the at least one other tracking area responsive to receiving a second message for requesting third information for the tracking area, and wherein the at least one other tracking area comprises at least one of a first tracking area adjacent to the tracking area, in which a number of transmissions of random access signals exceeds a threshold, or a second tracking area, wherein the tracking area and the second tracking area are common in tracking area lists of a plurality of terminals.

28. The apparatus of claim 27, wherein the at least one transceiver is further configured to receive at least one report on cell congestion occurrence from each of at least one base station (BS), wherein the at least one processor is further configured to determine a congestion tracking area based on the at least one report, and wherein the first tracking area is the congestion tracking area.

29. The apparatus of claim 28, wherein the at least one processor is further configured to:
determine a ranking of congestion for each of tracking areas based on the at least one report; and
determine the congestion tracking area among the tracking areas according to the ranking.

30. The apparatus of claim 27, wherein the at least one transceiver is further configured to receive the tracking area lists of each of the plurality of terminals from the node managing a mobility of terminals, and
wherein the at least one processor is configured to identify the same mobile profile presented in the tracking area lists of each of the plurality of terminals.

* * * * *